(12) United States Patent
Bindouski et al.

(10) Patent No.: US 12,107,982 B2
(45) Date of Patent: Oct. 1, 2024

(54) METHODS FOR MANAGEMENT THE STATE OF BUTTONS OF PERIPHERAL DEVICES, IMPLEMENTING SECURE REMOTE CONTROL OF THE USER INTERFACE, INTERACTION BETWEEN APPLICATIONS, AND ALSO THE ANSWERING MACHINE, PBX AND VoIP-CELL GATEWAY ON THE BASIS OF SMARTPHONES

(71) Applicant: 3HAND LLC, Wilmington, DE (US)

(72) Inventors: Uladzimir Bindouski, Minsk (BY); Siarhei Kuchun, Minsk (BY)

(73) Assignee: 3HAND LLC, Wilmington, DE (US)

( * ) Notice: Subject to any disclaimer, the term of this patent is extended or adjusted under 35 U.S.C. 154(b) by 0 days.

(21) Appl. No.: 18/501,553

(22) Filed: Nov. 3, 2023

(65) Prior Publication Data

US 2024/0195903 A1    Jun. 13, 2024

Related U.S. Application Data

(60) Provisional application No. 63/431,049, filed on Dec. 8, 2022.

(51) Int. Cl.
| | | |
|---|---|---|
| *H04M 1/253* | (2006.01) | |
| *G06F 3/023* | (2006.01) | |
| *G06F 3/0484* | (2022.01) | |
| *G06F 13/10* | (2006.01) | |
| *G06F 13/12* | (2006.01) | |

(52) U.S. Cl.
CPC ........ *H04M 1/2535* (2013.01); *G06F 3/0238* (2013.01); *G06F 3/0484* (2013.01); *G06F 13/10* (2013.01); *G06F 13/126* (2013.01); *H04M 2201/42* (2013.01)

(58) Field of Classification Search
CPC .. H04M 1/2535; G06F 3/0238; G06F 3/0484; G06F 13/10; G06F 13/126
See application file for complete search history.

(56) References Cited

U.S. PATENT DOCUMENTS

| | | | | |
|---|---|---|---|---|
| 6,523,072 B1 * | 2/2003 | Howarth | ................. | G06F 9/545 |
| | | | | 710/33 |
| 11,579,196 B1 * | 2/2023 | Almeida | ........... | G01R 31/3277 |
| 2008/0307096 A1 * | 12/2008 | Wang | ................... | G06F 15/16 |
| | | | | 709/227 |

(Continued)

*Primary Examiner* — Phong H Dang

(57) ABSTRACT

Method for managing the state of buttons of peripheral devices of computers of any type (including smartphones, tablets, etc.) is considered in the context of safe management by the corresponding segment of the user interface in the automatic or remote mode without direct tactile communication with the user, but at his desire. Manipulation with buttons on peripheral devices is carried out by the button state change agent which is built in directly the peripheral device who in turn is controlled on the channel of interaction of the computer and the peripheral device means of the software of the computer. Based on the technical result of using appropriately implemented additional user interfaces are also claimed methods of remote management of the computer, interactions between applications and also implementations of the answering machine, PBX and the VoIP-Cell gateway on the basis of smartphones.

30 Claims, 12 Drawing Sheets

(56) References Cited

U.S. PATENT DOCUMENTS

| | | | | |
|---|---|---|---|---|
| 2010/0045490 | A1* | 2/2010 | Odell | H03M 11/14 341/22 |
| 2014/0320421 | A1* | 10/2014 | Wei | G06F 3/0412 345/173 |
| 2015/0052270 | A1* | 2/2015 | Wong | G06F 13/4291 710/106 |
| 2015/0138085 | A1* | 5/2015 | Wilk | G06F 3/017 345/158 |
| 2017/0315620 | A1* | 11/2017 | Johri | G06T 7/70 |
| 2022/0114113 | A1* | 4/2022 | Nadin Pinheiro | G06F 3/165 |
| 2023/0359580 | A1* | 11/2023 | Lu | G06F 13/4282 |

* cited by examiner

METHODS FOR MANAGEMENT THE STATE OF BUTTONS OF PERIPHERAL DEVICES, IMPLEMENTING SECURE REMOTE CONTROL OF THE USER INTERFACE, INTERACTION BETWEEN APPLICATIONS, AND ALSO THE ANSWERING MACHINE, PBX AND VoIP-CELL GATEWAY ON THE BASIS OF SMARTPHONES

CROSS-REFERENCE TO RELATED APPLICATIONS

This application claims the benefit of U.S. Provisional Application No. 63/431,049, filed Dec. 8, 2022, which is incorporated herein by reference in its entirety.

TECHNICAL FIELD OF THE INVENTION

The presented inventions generally relate to user interfaces of computers of any type (including desktop computers, laptops, smart watches, smartphones, tablets, fitness bracelets, POS terminals, etc.) and, more specifically, to controlling buttons on peripheral devices without direct tactile communication with the user in automatic mode with appropriate implementations of an additional user interface, functions for remote control of the user interface, interaction between applications, as well as an answering machine, PBX and VoIP-Cell gateway based on smartphones.

BACKGROUND OF THE INVENTION

The presented inventions, the essence of which is reflected in the claims, are generally intended to expand the functionality of computers of any type, including desktop computers, laptops, smart watches, smartphones, tablets, single board computers, smart glasses (AR/VR), etc. In addition, as a result of the application of the technical result of the implementation of the presented inventions, new communication functionality appears on mobile computers with a built-in radio interface of a mobile phone (smartphones)—an authentic answering machine, PBX and VoIP-Cell gateway.

As stated above, the presented inventions are applicable to computers of any type, but to a greater extent they are relevant for computers with mobile operating systems (for example, IOS or Android), since the functions of remote or automatic access to the user interface of such computers exist at the previous level of technology, have serious limitations due to increased security requirements compared to other types of computers.

Thus, the present application refers to computers with a mobile operating system (tablets, smartphones), and specifically the most common type of computers—smartphones, implying that all the implementations described below are possible on computers of any other type.

Billions of people around the world use smartphones in their daily lives, which are the most common computers with a built-in graphical interface. A modem smartphone, having solid hardware and software resources, is a computer with wide application capabilities that are not fully used for many reasons, the main one of which is compliance with user safety standards.

One of the many aspects of the security features of smartphone operating systems is the principle of direct user participation to authorize or confirm certain actions, that is, the physical participation of the user in making decisions through the user interface.

Thus, actions of a program that are not expressly approved by the user of that program are considered unauthorized. Accordingly, some safety-critical actions without user participation become impossible. For example, actions such as making a phone call, controlling the camera, microphone, GPS, launching applications, etc., according to the operating system security policy, must be performed with the direct participation of the user. Otherwise, malicious applications may take advantage of the above functions maliciously.

Thus, even at the request of the user, but without his direct tactile participation, smartphones, according to the security policy of the operating system, do not have the ability to perform some tasks remotely or automatically, which narrows the scope of their application.

Considering the huge number of both in use and decommissioned smartphones in the world, the task of safely using some smartphone functions remotely or automatically is relevant today for users and developers.

The user interface of a smartphone includes a touchscreen, hardware and touch buttons located directly on the body of the smartphone, as well as buttons for peripheral devices connected to smartphones. Accordingly, the use of peripheral buttons to control applications, system and application functions of the smartphone, along with other user interface tools, is safe for the user, since the physical connection of an external peripheral device (for example, an audio headset) assumes the knowledge of the smartphone user that this device will be used by the user himself to perform some tasks remotely or automatically.

Thus, the claimed inventions are about the current additional use of the user interface of a smartphone and other computers in the form of buttons on peripheral devices to duplicate the actions of the user interface organs located directly on the body of a smartphone or any other computer, but in automatic mode or remotely without direct tactile participation of the user and, at his request, with the ability to interact between system and application applications of the smartphone, including for implementing the functions of remote and automatic control of the user interface of the smartphone, answering machine, PBX and VoIP-Cell gateway.

Based on the state of the art, there are solutions and implementations that only indirectly relate to the proposed topic. Some of them are briefly discussed below as examples.

For example, a programmable button that can be inserted into the headphone jack of a smartphone or tablet for use as an additional user interface for the device. In combination with the corresponding application, the button can control certain functions, such as turning on the flashlight, taking photos, turning off the phone, etc. But, this button is pressed by the user himself in "manual" mode. (https://en.wikipedia.org/wiki/Pressy_Button).

As an example, the Switch Access option of the Android operating system (https://support.google.com/accessibility/android/answer/6122836?hl=en) or the Switch Control option of the iOS operating system (https://support.apple.com/en-us/HT201370), allow a user to control the user's mobile device using hardware switches in conjunction with the touch screen, and essentially replace the graphical interface. These options tie various actions on the smartphone user interface to changes in the state of physical keys (device buttons or buttons for connecting additional peripherals), allowing interaction with the touch screen. Thus, through hardware buttons, interaction with the user interface of the smartphone is carried out directly with the tactile participation of the user.

Another control system using a wireless audio headset (US20110032071A1), which, in addition to its basic functions as a mobile phone headset, is a control center for several other devices connected to the same wireless network. That is, this wireless headset is additionally a control panel for other electronic devices using special additional buttons located on this headset for "manual" control. Similar functions are performed by a special device included in the TRRS connector of the smartphone (US20130330084A1).

Sometimes, to duplicate the actions of buttons, special accessories that have a wireless connection with a smartphone are used (JP2015513267A, U.S. Pat. No. 9,344,860B2 and EP1959655A1). And the buttons located on the smartphone are duplicated by the buttons on this accessory for "manual" control.

There are also patented solutions for implementing additional smartphone control capabilities with special freely configurable function buttons located directly on the audio headset (U.S. Pat. No. 9,398,361B1), or existing buttons with user-changeable action results (WO2001037524A1).

Patented methods and systems similar to U.S. Pat. No. 7,738,434B1 are known, where headphones with a corresponding connection to a wireless network are controlled via a web server by changing parameters on the corresponding web page.

The following are some examples of proprietary methods for remotely controlling the user interface and functions of a smartphone.

For example, there are solutions for transferring and duplicating the user interface of an electronic device to a specialized remote device for managing and monitoring multiple electronic devices, including a smartphone via a wireless network (US20100293462A1 and US20160134737A1).

Patented methods and devices for controlling the functions of a smartphone from another device via an NFC module (KR100911032B1 and KR20080002835A) are also known.

Methods for remote access to smartphone resources through a website hosted directly on the smartphone using a web browser on a remote computer have been patented (JP2014509027A and KR101579892B1).

Another method of remote access involves receiving a command file from a control device via Bluetooth, followed by execution by the corresponding application on the controlled device (US20190014179A1).

The solutions described above, which in principle are not analogues or prototypes of the claimed invention, are presented only to describe the prior art.

Let's consider some new possibilities and approximate scenarios for using the technical results of the proposed method of controlling buttons on peripheral devices of smartphones without direct tactile communication with the user, not known from the previous level of technology.

The use of an additional button user interface on smartphone peripherals with control of smartphone software without direct tactile communication with the user provides the ability to securely interact between application applications and system functions of the smartphone through an additional user interface in the form of buttons of a smartphone peripheral remotely or automatically at the user's request, but without his direct tactile participation.

For example, in automatic mode or remote access mode, actions may be performed including but not limited to answering and ending a phone call, launching applications, navigating (going back to the home screen), performing system functions (turning on and off the flashlight, Wi-Fi, camera, microphone) and so on. Accordingly, secure automatic control of telephone and IM/VoIP smartphone applications makes it possible to create various authentic application applications based on the smartphone, which can function automatically without direct user participation. For example, answering machine applications, PBX and VoIP-Cell gateway, etc.

In particular, the implementation of an answering machine using the technical results of the claimed invention assumes that the actions of answering a call and ending a call are performed directly by an answering machine application with flexible settings installed by the user on a smartphone, through controlling the buttons of a peripheral device in accordance with certain events. At the same time, the practical application of the claimed invention in terms of the implementation of an answering machine allows an ordinary user to use audio headsets and speakers as peripheral devices with an additional answering machine function, when the actions of answering a call and ending a call at the time of content playback are performed directly by the music player application with an answering machine in automatic mode.

In addition, it becomes possible to implement a scenario unknown in the prior art where call answering and call ending actions for telephony and IM/VoIP communications applications are performed directly by a third-party application with PBX functionality through the control of peripheral device buttons. In this case, communication applications are PBX clients and have mutual communication capabilities, including VoIP-Cell gateway functionality, and communication with other clients of available PBX networks. The PBX application can be installed either directly on this smartphone or on third-party computers.

The application of this invention is not limited to the examples described above, since developers and users are offered fundamentally new, broad capabilities and options for using the hardware and software resources of smartphones within the new ecosystem.

Therefore, there is a need to provide methods for automatically and remotely controlling buttons on smartphone peripherals and associated smartphone user interfaces in an automatic manner without direct tactile communication with the user.

SUMMARY OF THE INVENTION

The technical problem to which the claimed invention is aimed can be formulated as the development of a method for controlling the states of buttons on peripheral devices of computers of any type (including computers with a mobile operating system) without direct tactile communication with the user, using the hardware software resources of the computer and connected to the corresponding peripheral device, taking into account that the state of buttons on computer peripheral devices should be controlled automatically or remotely under the control of the user, but without his direct physical participation.

The technical result is achieved by using, in several aspects, a method for controlling the state of buttons on peripheral devices of computers of any type (including computers with a mobile operating system) without direct tactile communication with the user using a button state change agent built directly into the peripheral device, which upon a command generated by the computer software and received through the interaction channel between the computer and the peripheral device, it changes the state of the corresponding button of the peripheral device.

This software may be implemented as a stand-alone computer application, or as part of an operating system functionality, or as an API for use in application development.

Thus, aspects of the method for changing the state of buttons on peripheral devices set forth in this patent application, along with the corresponding control of the built-in agent for changing the state of buttons on a peripheral device using computer software, provide the technical result of controlling buttons on computer peripheral devices without direct tactile communication with the user with the corresponding implementation of additional user interfaces for computers of any type (including computers with a mobile operating system).

A summary of the material necessary to understand the essence of the invention will be presented below in the order of content of the claims.

In one aspect, the present invention includes a method that includes changing the state of buttons on peripheral devices connected to a computer by transmitting a corresponding command in the format of a corresponding analog electrical signal to the output of a computer audio interface by means of computer software.

That is, the button state change agent on the computer peripheral device detects the corresponding command in analog format from the audio signal received by the peripheral device, and according to this command changes the state of the buttons. Details for a computer in smartphone format are illustrated in FIG. 1.

In another aspect, the present invention includes a method that includes changing the state of buttons on peripheral devices connected to a computer as a result of transmitting a corresponding command in a message format transmitted by computer software over an appropriate digital interface connecting the computer and the peripheral device.

That is, the agent for changing the state of buttons on a computer peripheral device receives the corresponding command in message format via a digital wired or wireless interface transmitted by computer software, and according to this command changes the state of buttons for applications working with this peripheral device. Details for a computer in smartphone format are illustrated in FIG. 1.

In yet another aspect, the present invention includes a method that includes physically changing the state of a button on a computer peripheral device using a corresponding hardware electrical switch that is contained in a button state change agent for physically closing and opening button contacts on the computer peripheral device. That is, an agent for changing the state of buttons on a computer peripheral device, implemented in the form of a hardware electrical switching key, upon command from the corresponding computer application, physically closes or opens the contacts of the corresponding button of the peripheral device. Details for a computer in smartphone format are illustrated in (FIG. 2).

To change the state of the switching key, both energy and frequency components of the parameters of the audio control signals can be used. For example, audio signals with a certain frequency or power can be used to close or open the contacts of a key. It is also possible to use ultrasonic frequencies to generate the necessary energy at the audio output of the computer to control the key.

In addition, a physical change in the state of a button on a computer peripheral device with a corresponding closing or opening of the hardware electrical switching key is possible as a result of receiving and interpreting into an electrical signal the corresponding command in the message format transmitted to this peripheral device by computer software via the corresponding digital interface, connecting the computer and the peripheral device.

In a further aspect, the present invention includes a method that comprises logical changing the state of a button on a computer peripheral device using a message that is generated by a button state change agent about a state change event for the corresponding button via communication channels between the peripheral device and the computer.

That is, the agent for changing the state of buttons on a computer peripheral device, implemented as part of the functionality of the peripheral device, in response to a command from the corresponding computer application, sends a response message through the interaction channel between the peripheral device and the computer about changing the state of the corresponding button. In this case, a simulation of a change in the state of a button actually occurs, the physical state of which does not change, but only a message about the corresponding event is generated. Details for a computer in smartphone format are illustrated in FIG. 3.

In the following three aspects, the present invention includes methods that include changing the state of buttons on peripheral devices connected to a computer via different types of interfaces: wired analog and digital interfaces, as well as a wireless interface.

These aspects simply state the fact that it is possible to change the state of buttons on peripheral devices connected to a computer via any type of interface. Details for a computer in smartphone format are illustrated in FIG. 1, 2, 3.

In yet another aspect, the present invention includes a method that further comprises controlling buttons on peripheral devices connected to any type of computer (FIG. 1, 2, 3).

The button state change agent can be built into almost any peripheral device, which can be universal in terms of interaction with any type of computer with a suitable operating system and drivers, that is, containing appropriate software for controlling the button state change agent.

As a consequence of the application of the technical result of the method described above, an invention is claimed for a method for secure interaction between applications without direct tactile participation of the user through an additional user interface in the form of buttons on peripheral devices working with these applications.

The technical problem to which the claimed invention is aimed can be formulated as the development of a new method of interaction between applications installed on computers, using an additional user interface in the form of buttons on peripheral devices connected to computers, using computer software without direct tactile communication with the user with appropriate ways to implement the functions of an answering machine, PBX and VoIP-Cell gateway based on smartphones.

The technical result is achieved through the use of a peripheral device connected to a computer, containing buttons with the ability to control computer software, and configured in accordance with the method described above for controlling buttons on computer peripheral devices without direct tactile communication with the user, as well as control of the corresponding application by changing the state of the buttons of the peripheral device working with this application, computer software and an agent for changing the state of the buttons of the peripheral device through the interaction channel between the computer and this peripheral device without direct tactile communication with the user.

The claimed invention includes the aspects and variations described below, which contain details that disclose the invention.

In one aspect, the present invention includes a method that includes interaction between computer applications installed on the same computer, and in another aspect includes a method that includes interaction between computer applications installed on different computers.

That is, in other words, in these aspects it is stated that the interaction of applications is possible through mutual control of the buttons of a peripheral device connected to both the same computer in the case where the interacting applications are installed on the same computer (FIG. 1), and to two computers simultaneously if the interacting applications are installed on two different computers (FIG. 4).

In yet another aspect, the present invention includes a method that includes interaction between different applications of the same smartphone if one application controls another application with corresponding access of the control application to a button state change agent of a smartphone peripheral device through a smartphone-to-peripheral interaction channel device, and the managed application contains the user interface in the form of the same buttons on the peripheral device connected to the smartphone.

That is, the managed application operates on a peripheral device and contains an additional button user interface on the peripheral device with a built-in button state change agent. The state of these buttons is manipulated through the button state change agent by the control application, which has access through the appropriate channels to the button state change agent of the given peripheral device. Thus, the control application, by changing the state of the user interface buttons of the controlled application, transmits information or necessary commands for execution to the controlled application (FIG. 1 and FIG. 4).

One embodiment of this aspect comprises managing mobile phone and IM/VoIP client applications to implement voice answering functions using a corresponding answering machine application to control a call answer and end button located directly on the peripheral device.

That is, the corresponding answering machine application controls the call answer and call end button through a button state change agent on a peripheral device with headset audio properties to answer the call and then play the greeting and call end after the caller has finished recording the message from the telephone network or IM/VoIP client contact.

Another variation of this aspect further comprises integrating a button state change agent directly into an audio headset connected to a smartphone as a peripheral device to implement voice answering functions when using a mobile telephone and IM/VoIP client (FIG. 5).

This embodiment proposes to integrate call answering and call ending functions directly into the headset, controlled by a corresponding mobile answering machine application.

A further embodiment of this aspect further provides a similar solution using an audio speaker instead of an audio headset as a peripheral device (FIG. 6).

Thus, as a result of the implementation of the claimed invention, audio devices with new properties useful to the consumer may appear on the audio market.

In another aspect, the present invention includes a method that includes interaction between applications of a smartphone and a computer of any type, where an application installed on the computer controls an application installed on the smartphone through the corresponding access of the computer control application to a peripheral device button state change agent connected to the smartphone, through the channel of interaction between the computer and the peripheral device, and the controlled smartphone application contains a user interface in the form of the same buttons on the peripheral device connected to the smartphone.

That is, the controlled smartphone application operates on the peripheral device and includes an additional button user interface on the peripheral device with a built-in button state change agent. The states of these buttons through the button state change agent can be changed by a control computer application that has access through the appropriate channels to the button state change agent of a given peripheral device. Thus, the control computer application, by changing the state of the user interface buttons of the controlled smartphone application, transmits information or necessary commands for execution to the controlled smartphone application (FIG. 7).

One embodiment of this aspect comprises interoperating a PBX application installed on any type of computer with smartphone voice communication applications, where the PBX application, in communication with appropriate smartphone software, is able to make a call, answer a call, and end a call through a user data interface of communication voice applications by controlling the agent for changing the state of the buttons of peripheral devices working with these communication voice applications through the channel of interaction between the PBX application and data of peripheral devices.

That is, controlled smartphone voice communication applications operate on peripheral devices, each of which contains an additional button user interface on that peripheral device with a built-in button state change agent. Since a PBX is a hardware collection of a computer device and smartphones with peripheral devices that are configured in a network infrastructure environment, the number of peripheral devices is related to the number of smartphones and managed applications of the configured PBX.

A PBX control computer application that has access through appropriate channels to the button state change agent of a given peripheral device controls the state of the peripheral device's buttons through the button state change agent. Thus, by changing the state of the user interface buttons of the controlled smartphone voice communication application according to logic to determine the circumstances under which to make a call, answer a call, or end a call, the controlling computer application performs PBX functions (FIG. 7).

Another variation of this aspect comprises interoperability where the clients of the PBX control application are managed smartphone applications of the IM/VoIP client and mobile phone, which under the control of the PBX are able to communicate with each other and communicate with other clients of the networks of available PBXs.

Thus, a PBX with appropriate technical options interacts with smartphone voice communication applications along with other PBX clients and, accordingly, manages the states of these applications both for call transfer between these applications and for call transfer between these applications and other PBX clients (FIG. 7).

Another embodiment of this aspect comprises interaction where mobile phone and IM/VoIP client applications are included in a VoIP-Cell gateway of a managed PBX to transfer a voice call between these applications and other clients of the available PBX networks.

That is, mobile telephone and VoIP client voice communication applications are used in communication to transfer a call between different networks, that is, between mobile telephone networks and IP networks, under the control of the PBX (FIG. 7).

In a further aspect, the present invention includes a method that includes interaction of two different applications installed on computers of any type through an additional user interface in the form of buttons on peripheral devices connected to the computers, when the first application has the ability to control the state change agent of the buttons of the peripheral device working with the second application, through the channel of interaction between the first application and this peripheral device, and accordingly, the second application has the ability to control the agent for changing the state of the buttons of the peripheral device, working with the first application, through the channel of interaction between the second application and this peripheral device.

That is, the first application has the ability to control the second application through access to the user interface of the second application, which is through the button state change agent of the peripheral device operating with the second application. In the same way, the second application has the ability to control the first application. Details for a computer in smartphone format are illustrated in FIG. 8.

One embodiment of this aspect comprises the interaction of two different communication voice applications installed on computers of any type, where the first communication voice application has the ability to make a call, answer a call and end a call through the user interface of the second communication voice application, and accordingly the second communication voice application has the ability to make a call, answer a call and end a call through the user interface of the first communication voice application.

That is, this embodiment contains the ability to interact and synchronize the response to certain events of two different communication voice applications when transferring a call from one application to another and vice versa. For example, this type of interaction between these applications allows you to organize automatic interaction between mobile telephone and IM/VoIP clients based on smartphones without direct tactile user participation and external additional services (FIG. 9).

As a consequence of the application of the technical result of the method described above, an invention is claimed for a method for remotely controlling a computer of any type (including computers with a mobile operating system) with an additional user interface in the form of buttons on a peripheral device without direct tactile communication with the user.

The technical problem to which the claimed invention is aimed can be formulated as the development of a new method for remote control of a computer of any type, using an additional user interface in the form of buttons on a computer peripheral device, using computer software and a remote control application of a control computer of any type without direct tactile communication with the user of the controlled computer, but at his request.

The technical result is achieved through the use of a peripheral device connected to a controlled computer, containing buttons with the ability to change the state using computer software, configured in accordance with the method described above for controlling buttons without direct tactile communication with the user, and controlling the state of the buttons of this peripheral device by a local application of the managed computer through an agent for changing the state of buttons built into the peripheral device, upon a command received via communication channels from the control application of the remote computer.

That is, secure remote control of a computer is achieved by the interaction of a remote user of the controlling remote computer with the user interface of the controlled computer by non-tactile changing the state of the buttons of the peripheral device, used as an additional user interface of the controlled computer, in accordance with received commands from the controlling remote application.

It is clear that interaction architectures or models for remote control of devices and applications can be anything. For example, such as "client-server" or direct protocol interaction, and so on. The main thing is that the principles of remote control or access contained in the claims can be easily projected onto various existing and developed user devices and interaction models by specialists in the field.

The claimed invention includes the aspects described below, which contain details that disclose the invention.

In one aspect, the present invention includes a method that further comprises dynamically reassigning, by means of software on the managed computer, the results of a button action on a peripheral device to the desired results of interaction with a user interface each time in accordance with the next received command to control the user interface of the managed computer from the manager applications of a remote computer without direct tactile communication with the user of the controlled computer (FIG. 10).

Thus, preliminary configuration occurs to synchronize the results of the actions of the buttons of the peripheral device with the necessary results of remote interaction with the user interface of the managed computer in accordance with the commands received from the control application of the remote computer.

In addition, to remotely control user interface functions, you can use only one user interface button of a peripheral device with the corresponding properties, since it is possible to dynamically receive a new action result after each state change (press) of the same button of a peripheral device user interface of the managed computer by means of a new preliminary reassignment by means of the software of this computer of the result of the action of pressing this button to a new result of the action of the user interface of the computer each time in accordance with the next received command for remote control of the user interface.

In another aspect, the present invention includes a method that further comprises controlling the state of a button on a peripheral device and a corresponding user interface segment of a managed computer by software of a specific local application of that computer in accordance with remote user commands received through a screen projection of the user interface of the managed computer, displayed on the screen of the remote control computer and used to manipulate the user interface of the controlled computer by the remote user in real time (FIG. 10).

That is, in this case, not only the contents of the screen are transmitted to the remote control computer, but also similar possibilities for manipulating the user interface of the controlled computer. Thus, remote and local users have the same ability to control the computer from both the local and remote on-screen user interface.

In yet another aspect, the present invention includes a method that further comprises controlling the state of a button on a peripheral device and a corresponding segment of a computer user interface in accordance with voice commands of a remote user received over appropriate communication channels (FIG. 10).

That is, between the local computer application, which directly manipulates the button state change agent and the corresponding segment of the computer user interface, and the remote user, there is a corresponding voice channel, which can be implemented either through communication via IM/VoIP services or mobile telephony, or and the functionality of the corresponding control application of a remote computer of any type. In addition, the local application has the ability, using system or any other software tools, to interpret the corresponding voice commands to subsequently change the state of the buttons of the peripheral device to manipulate the corresponding segment of the smartphone user interface.

In a further aspect, the present invention includes a method that further comprises controlling the state of a button on a peripheral device and a corresponding user interface segment of a smartphone in accordance with text commands from a remote user received over appropriate communication channels (FIG. 10).

That is, between the local computer application, which directly manipulates the button state change agent and the corresponding segment of the computer user interface, and the remote user, there is a corresponding channel for text messaging, which can be implemented either through communication via IM/VoIP services or mobile phone communication and the functionality of the corresponding control application of the remote computer. In addition, the local application has the ability, using system or any other software tools, to interpret the corresponding text commands to subsequently change the state of the buttons of the peripheral device to manipulate the corresponding segment of the computer's user interface.

In yet another aspect, the present invention includes a method that includes local control of a computer of any type, where the functions of the local application and the control application are implemented directly on the same computer for controlling a user interface by means of any other application that uses these functions, in automatic mode without direct tactile participation of the user, but at his request (FIG. 11).

That is, the local application that changes the states of the buttons on the peripheral device through the button state change agent and the control application are installed on the same computer. Thus, by applying this aspect of the corresponding method in practice, it is possible to organize previously planned safe automatic, without direct tactile participation of the user, but at his request, control of the computer through simulation of control of the computer user interface in accordance with certain events.

In yet another aspect, the present invention includes a method that includes controlling a smartphone without tactile communication with the user of the smartphone through the user interface of a control application installed on any type of computer, when the smartphone and the computer are operated simultaneously and are physically accessible to the same and the same user.

Thus, the user, directly from his computer using a connection to a peripheral device running the corresponding smartphone application, gains legal and secure access to control the user interface of the smartphone (including the touchscreen) and can perform actions such as answering a phone call and ending make a phone call, launch applications, navigate (go back to the home screen), perform system functions (turn on and off the flashlight, Wi-Fi, camera, microphone) and much more (FIG. 12).

A variant of this aspect further comprises a peripheral device of a controlled smartphone with a built-in agent for changing the state of buttons, implemented by software and hardware of a control computer of any type, connected to the controlled smartphone via interface communication channels of the control computer and the smartphone, when the agent for changing the state of buttons is controlled directly the corresponding application of the control computer through the internal channels of this computer.

That is, the peripheral device of the controlled smartphone, implemented directly by software based on the control computer, physically exists in the format of this computer and uses the computer interfaces to connect to the smartphone. For example, a Bluetooth software headset implemented in this way connects to a smartphone via the Bluetooth protocol, and the user uses the corresponding application, as well as the speakers and microphone of the computer for audio communication using the smartphone.

Since the Bluetooth headset software application and the control application are installed on the same computer, the interaction of these applications to change the state of the corresponding headset button occurs directly through the software via the internal channels of this computer. Next, an event about a change in the state of the headset soft button is sent via Bluetooth channels to the local smartphone application with subsequent processing to influence the user interface of the smartphone (FIG. 12).

Methods of interaction between applications and remote control of any type of computer (including desktop computers, laptops, smart watches, smartphones, tablets, fitness bracelets, POS terminals, etc.), developed based on control of buttons on computer peripheral devices without direct tactile communication with the user, provide safe and operating system-allowed possibilities for manipulating the user interface to develop new applications and services that are interesting to ordinary users without providing exclusive rights to the user when applied to computers with mobile operating systems. For example, root for Android and jailbreak for IOS.

Thus, for various implementations based on the claimed inventions, there will be no need for adaptation of the system software of smartphones and tablets either by operating system developers or by numerous manufacturers.

Accordingly, the claimed inventions can be used to develop appropriate solutions for a large number of users of computers of any type (including smartphones and tablets) within the framework of the security policy of the developers of the corresponding operating systems.

BRIEF DESCRIPTION OF THE DRAWINGS

The accompanying drawings included herein illustrate several aspects of the invention with corresponding embodiments of the invention using smartphone-type computers as examples and, together with the description, serve to explain the principles of the invention for any type of computer.

DETAILED DESCRIPTION OF THE INVENTION

For the most complete understanding of the concepts of the claimed inventions and the corresponding technical results by specialists in this field of technology, the material presented below provides detailed descriptions and drawings of exemplary implementations of the claimed inventions in practice for smartphone-type computers, taking into account the fact that all the implementations set out below are possible and on any other type of computer.

The following detailed description presents exemplary implementations of the invention in practice and does not limit the present invention, the scope of which is defined by the claims.

Aspects and embodiments of the present inventions provide methods for automatically and remotely controlling buttons on smartphone peripherals without direct tactile communication with the user, with corresponding implementation of additional user interfaces, remote control of the smartphone user interface, interaction between mobile applications, and answering machine, PBX functions and VoIP-Cell gateway.

Figure 1:
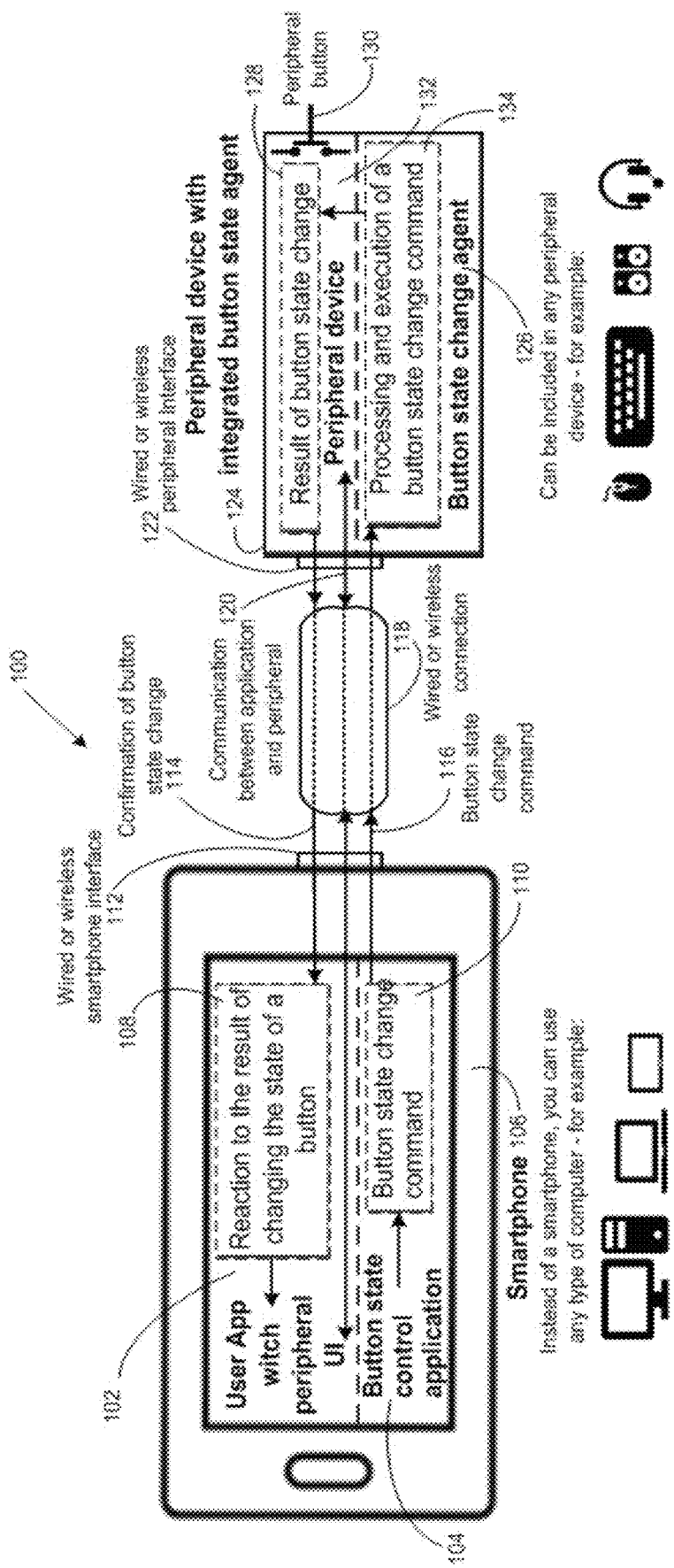
FIG. 1 Illustrates a way to control buttons on smartphone peripherals without tactile communication with the user in a minimal use case, as well as a way to interact between mobile applications.

FIG. 1 illustrates an implementation of a method for controlling buttons on smartphone peripherals without direct tactile communication with the user in a minimal use case of an abstract single-button peripheral.

The claimed invention is illustrated in FIG. 1 can be applied using virtually any peripheral device with any number of buttons. For example, this could be an audio headset, audio speakers, keyboard, mouse and other devices with any appropriate interface for connecting to a smartphone.

The smartphone 106 has a connection 118 with the peripheral device 124 with the same type of interfaces 112 and 122. According to the attached claims, these interfaces can be any type of interface, that is, wired or wireless, and digital or analog.

Accordingly, the user application 102, through channel 120 through connection 118, operates with a peripheral device 132 that has a button state change agent 126 embedded. Thus, the peripheral device 124 is generally a peripheral device 132 with a button state change agent 126 built in. In addition, the smartphone 106 is pre-installed with an application for controlling the state of the button 104.

During operation, the user application 102 responds with an appropriate action to the event of a change in the state of the button 130. For example, this application, depending on its purpose, upon the event of a button press, can answer an incoming phone call, turn on a flashlight, turn on a camera, launch another application and so on. In the prior art, the state of the button 130 is generally changed by the user.

Controlling buttons on smartphone peripherals without direct tactile communication with the user according to the example illustrated in FIG. 1 happens as follows.

The button state control application 104 generates and sends the appropriate command 110 over channel 116 of the interface 112 of the smartphone 106 via connection 118 and interface 122 of the peripheral device 124 to the button 126 state change agent.

Next, the button state change agent 126 processes and executes the button 134 state change command and accordingly changes the state of the button 130. Depending on the communication interface used between the smartphone and the peripheral device, the physical or logical state of the button 130 changes.

This procedure will be discussed in more detail below in the description of FIG. 2 and FIG. 3. Accordingly, the peripheral device 132, as part of its standard functionality, broadcasts the event of a change in the state of the button 130 in the format of the corresponding connection interface 122 in the form of a message 128 or an electrical signal 128 via channel 114 through the interface 122 of the peripheral device 124 and connection 118 to the interface 112 of the smartphone 106 for the application 102, which routinely performs the corresponding action 108 in response to a change in the state of the button of the peripheral device without tactile participation of the user. In fact, a situation similar to that when the user physically presses the button 130 is created.

A command to change the state of the button 110 can be generated and transmitted through the channels described above, both in the format of an analog electrical signal through any type of smartphone interface (wired or wireless, as well as digital or analog), and in the format of a corresponding message via a digital wired or wireless smartphone interface. The formats of the applied commands for changing the state of the button 110 and the types of interfaces 112 and 122 are reflected in the relevant aspects of the proposed method.

The method illustrated in FIG. 1 is fully applicable to control buttons without direct tactile communication with the user on the corresponding peripheral devices for computers of any type. For example, a desktop computer, laptop, smart watch, tablet, smart glasses (AR/VR), etc. This possibility is also reflected in the corresponding aspect of the proposed method.

Figure 2:
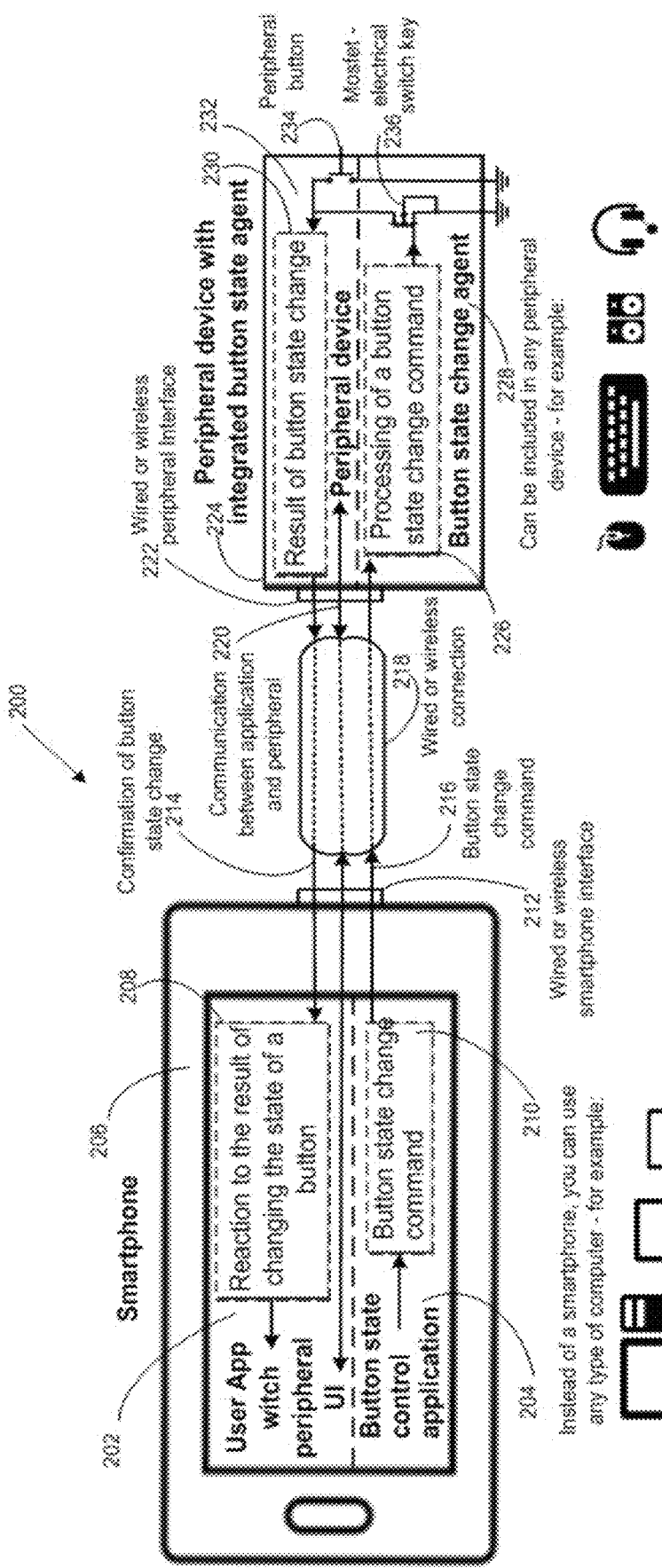
FIG. 2 Illustrates an aspect of a method for controlling buttons on smartphone peripherals without tactile communication with the user by physically closing and opening the button contacts using an appropriate hardware electrical switching key.

FIG. 2 illustrates an implementation of a method for controlling buttons on smartphone peripherals without direct tactile communication with the user for an aspect that includes physically changing the state of a button on a smartphone peripheral using a corresponding hardware electrical switching key that is contained in a button state changing agent for physically closing and opening contacts.

Since in FIG. 2 presents one of the aspects of the implementation of the claimed invention illustrated in FIG. 1, drawing FIG. 2 is structurally similar to drawing FIG. 1, and contains details of the use within the functionality of the agent for changing the state of buttons of a hardware electrical switching key switch connected in parallel to the button. Electrical switching key 236 for implementing the method according to FIG. 2 is shown as a semiconductor key of the Mosfet type. It is clear that in FIG. 2 illustrates one of the possible examples of corresponding implementations only for the most complete understanding of the essence of the invention.

The smartphone 206 has a connection 218 with the peripheral device 224 with the same type of interfaces 212 and 222. Accordingly, the user application 202 via channel 220 through connection 218 works with the peripheral device 224, which has a built-in agent for changing the state of the button 228. Thus, the peripheral device 224 is generally a peripheral device 232 with a built-in agent for changing the state of a button 228. In addition, a smartphone 206 is pre-installed with a state management application for a button 204.

Controlling buttons on smartphone peripherals without direct tactile communication with the user according to the example illustrated in FIG. 2 happens as follows.

The button state control application 204 generates and sends the corresponding command 210 through the channel 216 of the interface 212 of the smartphone 206 through the connection 218 and the interface 222 of the peripheral device 224 to the button state change agent 228. The button state change agent 228 then processes the received command 226 to issue the corresponding electrical a signal to open the switching key Mosfet 236, which in turn physically connects the contacts of the button 234 of the peripheral device 224. The duration and number of closures of the switching key can be determined by the parameters of the command 210 coming from the application 204 of the smartphone 206.

Accordingly, the peripheral device 224, as part of its standard functionality, transmits the corresponding message 230 or electrical signal 230 on the channel 214 through the interface 222 of the peripheral device 224 and connection 218 to the interface 212 of the smartphone 206 for the application 202, which routinely performs the corresponding action 208 responsive to change the state of a button on the peripheral device 234 without tactile input from the user. In fact, a situation similar to that when the user physically presses the button 234 is created.

Figure 3:
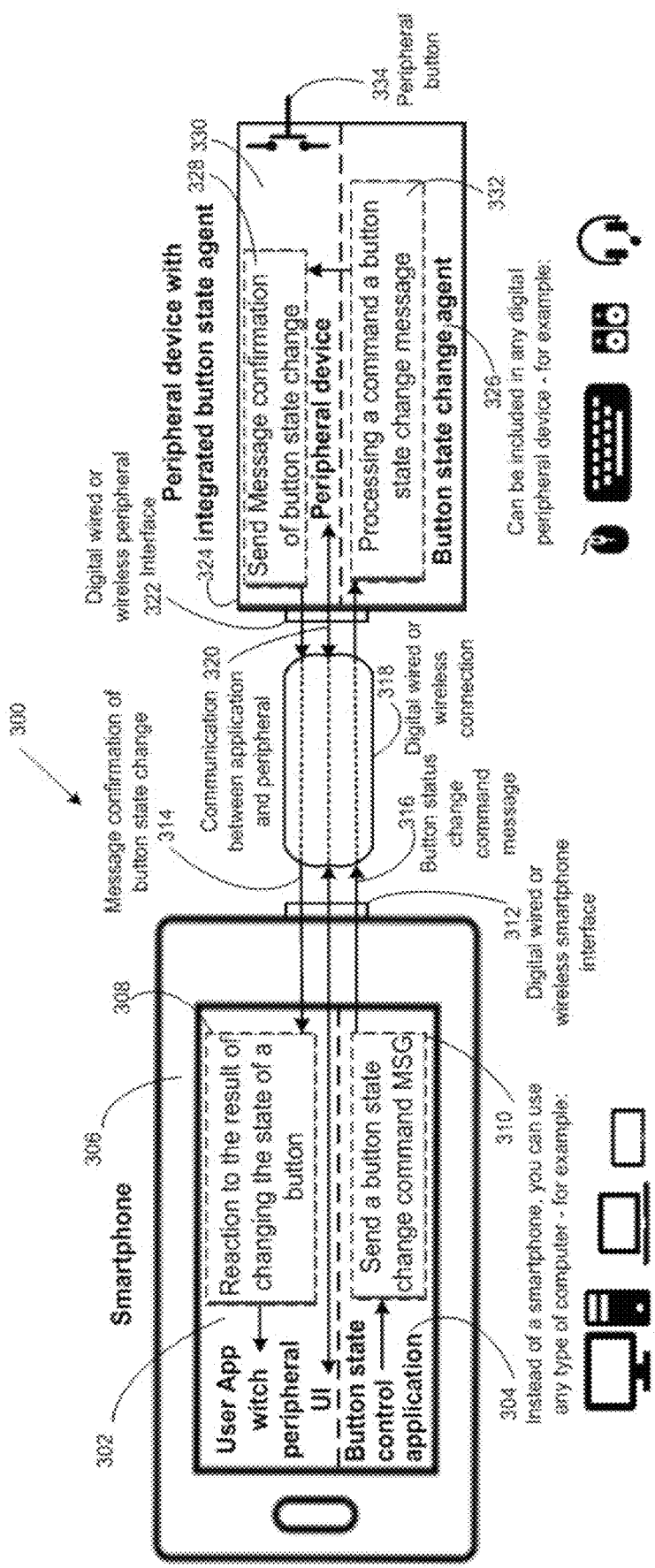
FIG. 3 Illustrates an aspect of a method for controlling buttons on smartphone peripherals without tactile communication with the user by logically changing the state of a button using the transmission of a state change event message for the corresponding button.

FIG. 3 illustrates an implementation of a method for controlling buttons on smartphone peripherals without direct tactile communication with the user for an aspect that includes a logical change in the state of a button on a smartphone peripheral using message transmission that is generated by a button state change agent immediately after a change in the state of the corresponding button via the peripheral connection channels.

Since in FIG. 3 shows one of the aspects of the implementation of the claimed invention illustrated in drawing FIG. 1, drawing FIG. 3 is structurally similar to drawing FIG. 1 and respectively in FIG. 2, and contains details of the use within the functionality of the agent for changing the state of buttons 326 of the function of processing an incoming command 332 and transmitting a message about the event of changing the state of the button 328, which is expected by the application 302 working with this peripheral device of the smartphone 306 in response to a command 310 from the button state control application 304 peripherals 324.

This application 302 expects and processes message 308 as a matter of routine without changing its functionality. That is, the button 328 state change event message generated by the button state change agent 326 does not differ in format and content from the corresponding message in the general case. Thus, in fact, a simulation of a change in the state of a button occurs, the physical state of which does not change, but only a message about the corresponding event is generated.

The smartphone 306 has a connection 318 with the peripheral device 324 with the same type of interfaces 312 and 322. Accordingly, the user application 302 via channel 320 through connection 318 works with the peripheral device 324, which has a built-in agent for changing the state of the button 326. Thus, the peripheral device 324 is generally a peripheral device 330 with a built-in button state change agent 326. In addition, a button state control application 304 is pre-installed on the smartphone 306.

Controlling buttons on smartphone peripherals without tactile communication with the user according to the example illustrated in FIG. 3 happens as follows.

The button status control application 304 generates and sends the corresponding command 310 through the channel 316 of the interface 312 of the smartphone 306 through the connection 318 and the interface 322 of the peripheral device 324 to the button state change agent 326. The button state change agent 326 then processes the received command 332 for generation and transmission corresponding message 328 about the event of a change in the state of the button 334, the physical state of which does not actually change.

Accordingly, the peripheral device 324, as part of its standard functionality, transmits the corresponding message 328 on the channel 314 through the interface 322 of the peripheral device 324 and connection 318 to the interface 312 of the smartphone 306 for the application 302, which routinely performs the corresponding action 308 in response to a change in the state of the button peripheral device without tactile user participation. In fact, a situation similar to that when the user physically presses the button 334 is created.

Since the method of secure interaction between applications installed on computers with an additional user interface in the form of buttons on peripheral devices connected to computers, without direct tactile communication with the user, is a consequence of the technical result of the method of controlling buttons on peripheral devices of computers, FIG. FIG. 1 can be used as a rough illustration of some aspects of this method of interaction between computer applications in a smartphone format.

It turns out that FIG. 1 further illustrates the implementation of a method of interaction between computer applications with an additional user interface in the form of buttons on computer peripherals in the smartphone format without tactile communication with the user for two aspects, which contain:

interaction between different computer applications installed on the same computer;

interaction between different smartphone applications if one application controls another application with corresponding access of the control application to the agent for changing the state of the buttons of the smartphone peripheral device through the interaction channel between the smartphone and the peripheral device, and the controlled application contains a user interface in the form of the same buttons on the peripheral device connected to a smartphone.

Thus, the preliminary configurations and connections illustrated in FIG. 1 correspond to preliminary installations for an example of implementing a method of interaction between smartphone mobile applications with the following clarifications. The user mobile application 102 of the smartphone 106 operating with the peripheral device 124 is a managed application. The mobile application 104 of the smartphone 106 is the control application. Both applications are installed on the same smartphone 106.

During operation, the controlled user application 102 responds with an appropriate action to the event of a change in the state of the button 130. For example, this application, depending on its purpose, upon the event of a button press, can answer a phone call, turn on a flashlight, turn on a camera, launch another application and so on. That is, it is assumed that, in general, in the prior art, the state of the button 130 is changed by the user himself.

The control application 104 of the smartphone 106, according to the scheme described above, changes the state of the button 130 according to the logic coded by the developer to react to any event without direct tactile participation of the user. In turn, the controlled application 102 of the smartphone 106 responds to a change in the state of a button on the peripheral device in the same way as if the user himself had physically changed the state of that button.

Thus, in general, interaction is carried out between smartphone mobile applications installed on the same smartphone, without direct tactile communication with the user, in particular when one application controls another application through the corresponding access of the control application to the peripheral button state change agent smartphone device, and the managed application contains a user interface in the form of the same button on the peripheral device connected to the smartphone.

Figure 4:
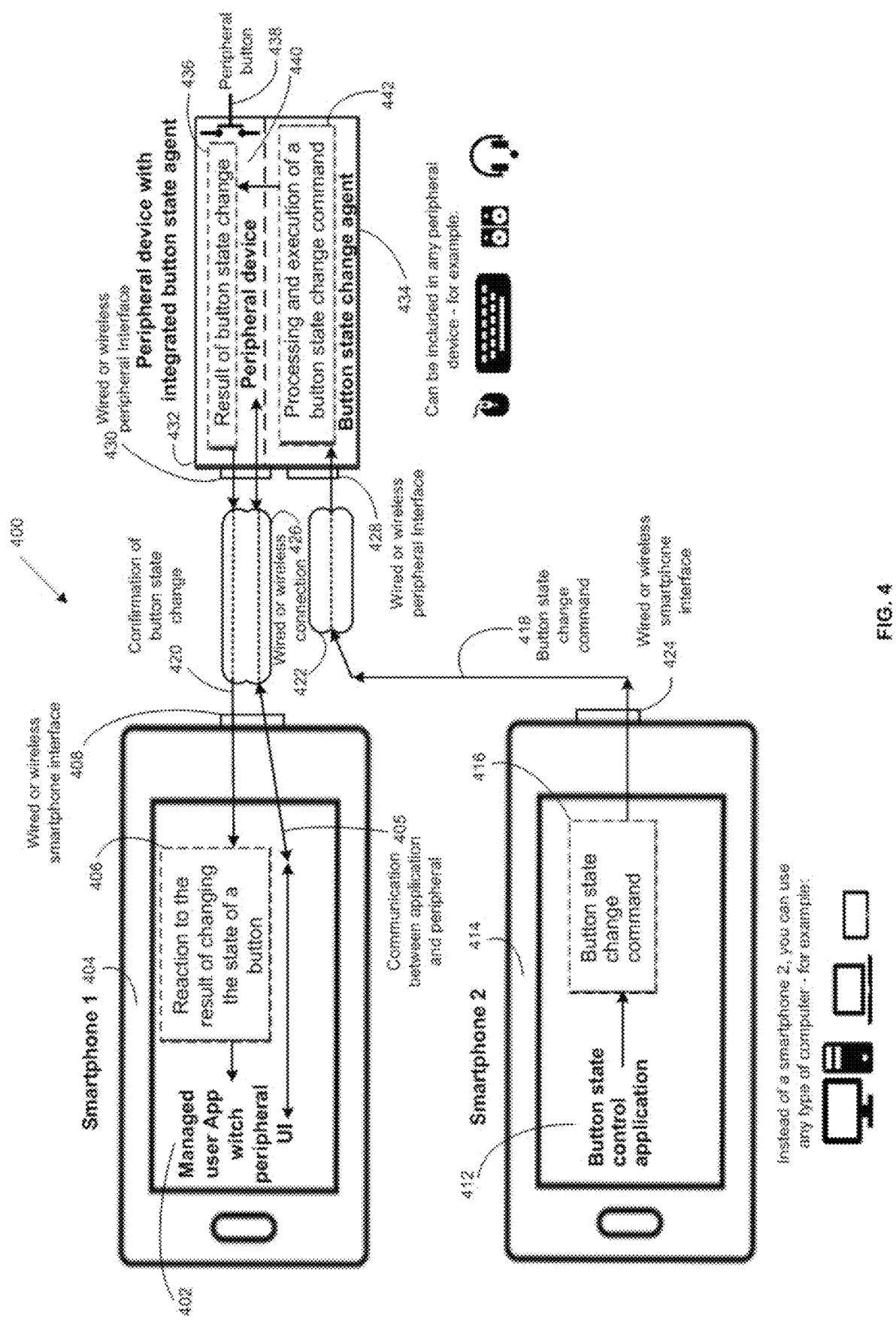
FIG. 4 Illustrates an aspect of the interaction method between mobile applications when the control and controlled applications are installed on different smartphones.

FIG. 4 illustrates an aspect of an inter-application communication method that comprises interaction between different computer applications in a smartphone format where the control and managed applications are installed on different smartphones.

The smartphone 404 has a connection 426 with a peripheral device 432 through the same type of interfaces 408 and 430. According to the claims, these interfaces can be any type of interface, that is, wired or wireless, and digital or analog. Accordingly, the controlled user application 402, which includes an additional user interface in the form of a button 438 on the peripheral device 432, operates via a link 410 through a connection 426 with the peripheral device 432, which has a built-in button state change agent 434. Thus, the peripheral device 432 as a whole is a peripheral device 440 with a built-in button 434 state change agent.

The smartphone 414 has a connection 422 with a peripheral device 432 through the same type of interfaces 424 and 428. According to the claims, these interfaces can be any type of interface, that is, wired or wireless, and digital or analog. Accordingly, the control application 412, via channel 418 via connection 422, controls the button state change agent 434, that is, changes the state of the peripheral device button.

In operation, the managed user application 402 responds with an appropriate action to the state change event of the button 438 as if the user initiated the button press. For example, this application, depending on its purpose, can answer a phone call, turn on a flashlight, turn on the camera, launch another application, and so on, when a button is pressed.

Interaction between different computer applications, when the control and controlled applications are installed on different computers in the format of smartphones without tactile communication with the user according to the example illustrated in FIG. 4 happens as follows.

The control application 412 for changing the state of the button generates and sends the corresponding command 416 through the channel 418 of the interface 424 of the smartphone 414 through the connection 422 and the interface 428 of the peripheral device 432 to the change state agent of the button 434. Next, the change state agent of the button 434 processes and executes the change command 442 state of the button 438 and accordingly changes the physical or logical state of the button 438.

This procedure was discussed in more detail above in the description of FIG. 2 and FIG. 3. Accordingly, the peripheral device 432, as part of its standard functionality, transmits the corresponding message 436 or electrical signal 436 on the channel 420 through the interface 430 of the peripheral device 432 and connection 426 to the interface 408 of the smartphone 404 to the controlled application 402, which routinely performs the corresponding action 406 in response to change the state of a peripheral device button without tactile user participation. In fact, a situation similar to that when the user physically presses the button 438 is created.

Figure 5:
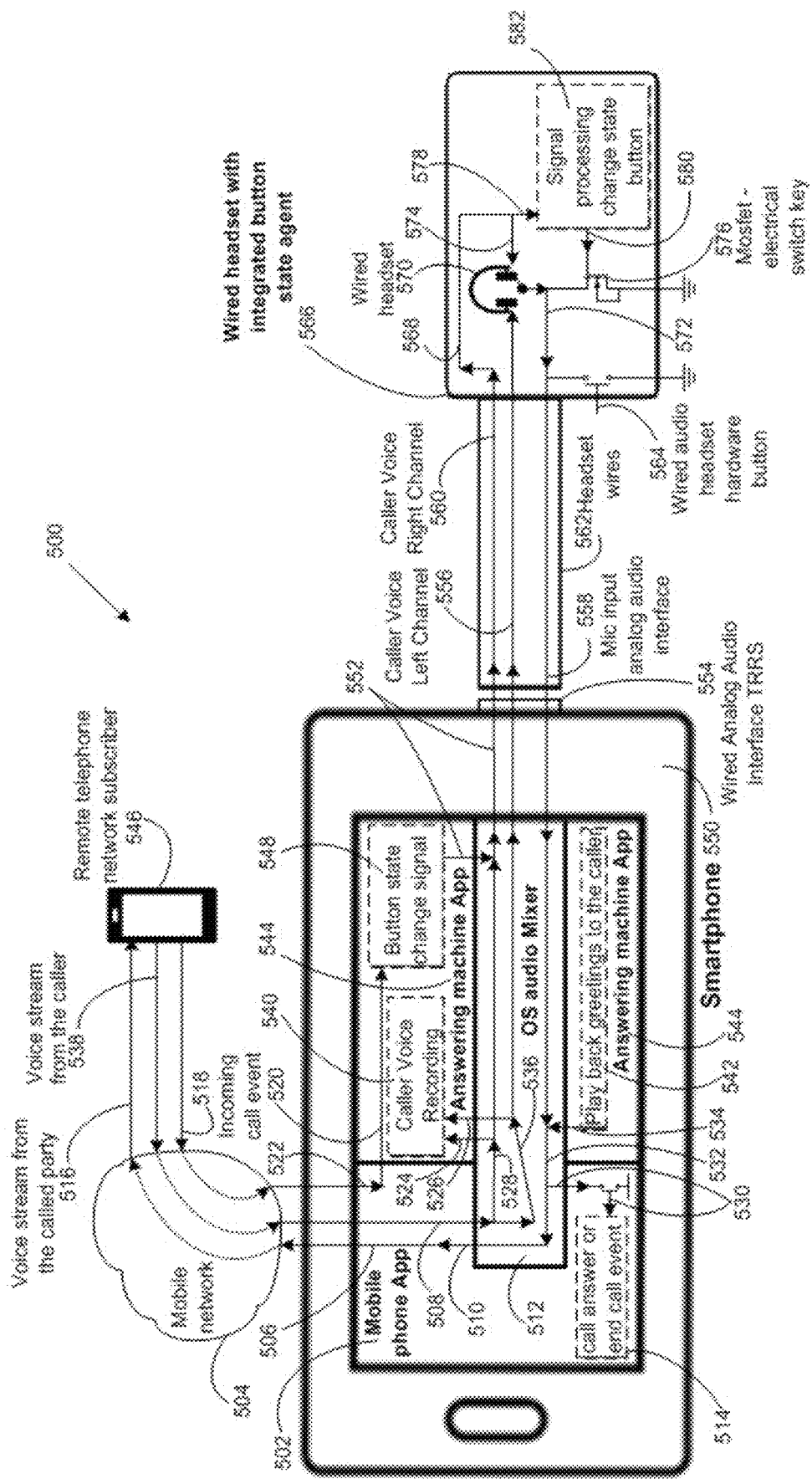
FIG. 5 Illustrates variants of an aspect of the method of interaction between mobile applications of the same smartphone, when the corresponding application controls the mobile phone application through a peripheral device button state change agent integrated directly into an audio headset, using the example of a voice answering machine implementation.

FIG. 5 illustrates an aspect of a method that includes interaction between different smartphone applications, where one application controls another application with corresponding control application access to a smartphone peripheral button state change agent via a smartphone-peripheral device communication channel, and the controlled application includes a user interface in the form of the same buttons on a peripheral device connected to the smartphone.

The illustration is an exemplary implementation of a voice answering machine based on a variant of this aspect where the controlled application is a mobile phone application and the control application is a corresponding answering machine application that actually controls a button to answer a telephone call or end a telephone call located directly on a wired analog headset with a built-in agent for changing the state of the headset button.

For a more complete understanding of the invention, FIG. 5 illustrates one of many example implementations with minimal options for the case of a wired analog headset with a single button.

Preliminarily, the smartphone 550 has an analog wired connection 562 via a wired TRRS connector 554 to an analog wired headset 570 with a built-in headset button state change agent, which includes an electrical Mosfet key 576 and an electrical button status change signal processing circuit 582. Accordingly, the headset is generally a 566 peripheral.

Interaction between the mobile phone client managed application 502 and the answering machine management application 544 according to the example illustrated in FIG. 5 happens as follows.

A remote subscriber to the telephone network 546 makes an incoming call to the mobile telephone client 502 of the smartphone 550. The corresponding event is reported via channels 518 and 522 to the mobile client application 502 of the smartphone 550 and then to the answering machine application 544 via channel 520. In response to this event The answering machine application 544 generates, through the operating system audio mixer 512 on channels 552 to the right audio output channel 560 of the analog interface 554, an electrical signal to change the status of the button 548.

This signal may have parameters of a previously determined frequency, amplitude and duration. For example, the frequency value to eliminate the occurrence of voice interference may be in the ultrasonic range, the duration value depends on the corresponding duration of pressing the button, and the amplitude value is related to the magnitude of the operating voltage of the electric key.

Next, the appropriately generated electrical signal 548 through channels 552, 560, 568 and 578 is sent to the signal processing circuit for changing the state of the button 582, which transforms the characteristics of this signal into the values necessary for the correct operation of the electronic key of the Mosfet 576 type, and produces the corresponding formatted signal via channel 580 to the control input of the electronic key 576, which opens for the duration of the signal changing the state of the button 548, corresponding to the duration of pressing the button to answer a telephone call, and accordingly closes the contacts of the headset button 564, that is, the microphone output 572 is connected to the ground wire.

In effect, a situation is created similar to that when the user physically presses button 564. The headset button press signal is then broadcast on channels 572, 558, 532 and 530 to the telephone mobile client application 502, which identifies this signal as the user's command to answer the call 514 and, accordingly, answers a call from a remote subscriber of the telephone network 546.

Next, the answering machine application plays the previously recorded greeting 542 to the remote subscriber 546 with an invitation to leave a voice message for the user on channels 534, 532, 510, 506 and 516.

The answering machine application 544 records a voice message 540 on channels 524 and 526 from a remote subscriber 546 on channel 538 via the mobile network 504, followed by the operating system mixer 512 converting the single-channel 508 signal into a dual-channel signal 528, 536. At the same time, this voice the message can be heard through the headset 570 on channels 528, 552, 560, 568, 574 and 536, 556. After the remote caller 546 completes the message, the answering machine application 544 issues a call end command in the form of a button 548 change state signal.

Next, the appropriately generated electrical signal 548 through channels 552, 560, 568 and 578 is sent to the signal processing circuit for changing the state of the button 582, which transforms the characteristics of this signal into the values necessary for the correct operation of the Mosfet 576 electronic key, and produces the corresponding formatted signal via channel 580 to the control input of the electronic key 576, which opens for the duration of the signal changing the state of the button 548, corresponding to the duration of pressing the button to end the call, and accordingly closes the contacts of the headset button 564. That is, the output of the microphone 572 is connected to the ground wire.

In effect, a situation is created similar to that when the user physically presses the button 564. The headset button press signal is then broadcast over channels 572, 558, 532 and 530 to the telephone mobile client application 502, which identifies this signal as the user's command to end the call 514 and accordingly ends the call.

Figure 6:
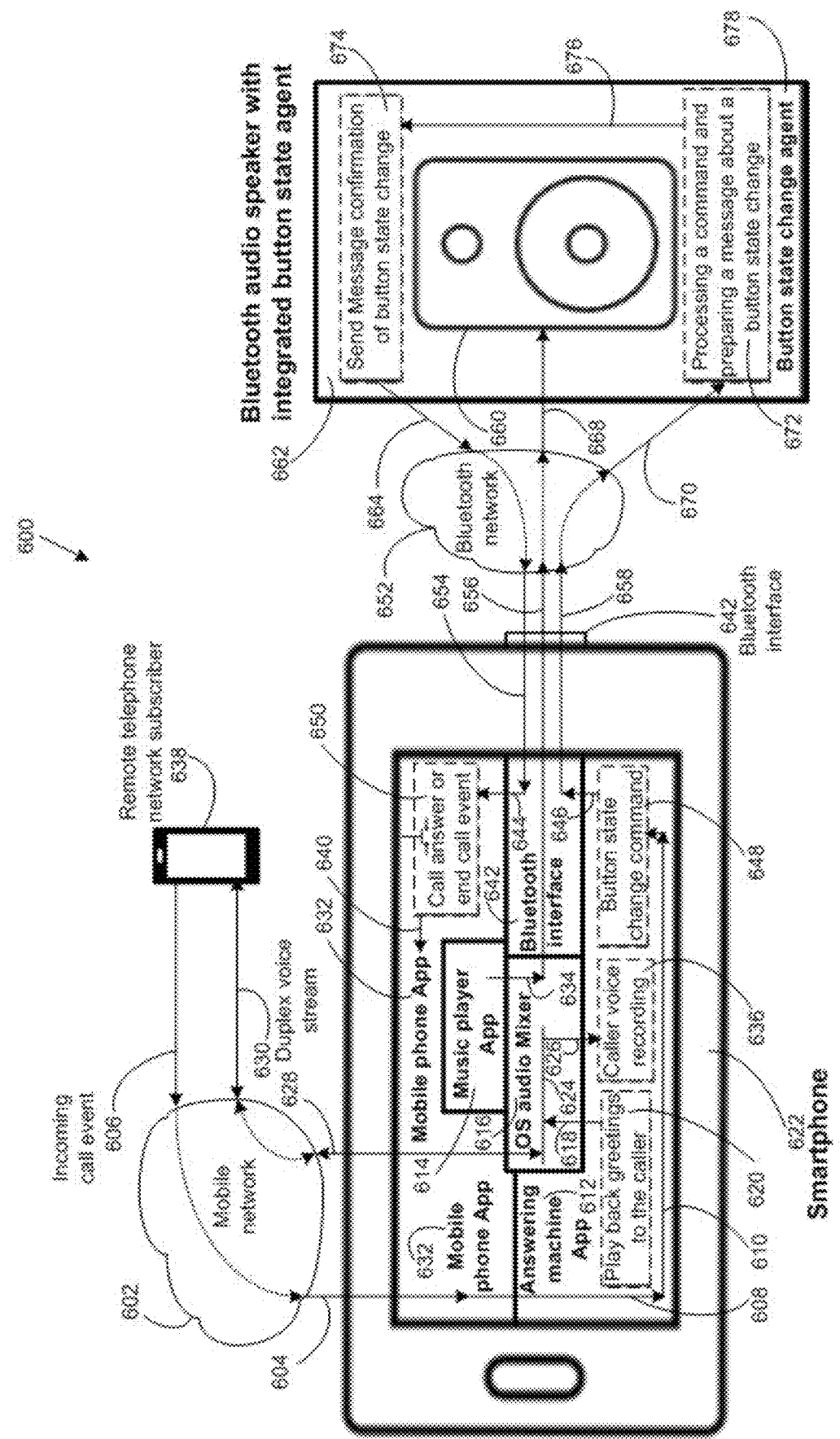
FIG. 6 Illustrates variants of an aspect of the interaction method between mobile applications of the same smartphone, when the corresponding application controls the mobile phone application through a peripheral device button state change agent integrated directly into the audio speaker, using the example of a voice answering machine implementation.

FIG. 6 illustrates an implementation example for another embodiment of an aspect of the method of interaction between different smartphone applications in the case where one application controls another application, when the button state change agent is integrated directly into an audio speaker connected to the smartphone via a wireless Bluetooth interface to implement the functions of a voice answering machine when using a mobile phone client.

Preliminarily, smartphone 622 has a wireless connection via Bluetooth interface 642 and Bluetooth network 652 to audio speaker 662, including audio speaker 660 itself and button state change agent 678. In general, a user-controlled music player application 614 plays audio content on speaker 660 by channels 634, 656 and 668 via Bluetooth network 652.

Interaction between the managed application of the telephone mobile client 632 and the management application of the answering machine 612 according to the example illustrated in FIG. 6 happens as follows.

A remote subscriber of the telephone network 638 makes an incoming call to the telephone mobile client 632 of the smartphone 622. The corresponding event is reported via channels 606 and 604 through the mobile network 602 to the telephone mobile client application 632 of the smartphone 622 and then to the answering machine application 612 via channels 608 and 610.

In response to this event, the answering machine application 612 sends a button state change command 648 to the button state change agent 678 via the Bluetooth interface 642 and the Bluetooth network 652 to the audio speaker 662 via channels 646, 658 and 670. The button state change agent 678 then processes this command and prepares a corresponding message about the change in the state of the button in action 672, which is transmitted via channel 676.

As a result, an authentic message confirming the change in the state of the button 674 is transmitted towards the smartphone 622 via channel 664 via the Bluetooth network 652 and Bluetooth interface 642 of the smartphone 622 and further via channels 654, 644 and 640 to the telephone mobile client application 632. Telephone mobile client application 632 determines the received message 650 as a user command to answer call 650 and accordingly answers the call to the remote subscriber of the telephone network 638. In effect, a situation is created similar to that when the user physically presses a button to answer the call.

Next, the answering machine application 612 plays the previously recorded greeting 620 to the remote subscriber 638 with an invitation to leave a voice message for the user on channels 618 and 624 through the operating system audio mixer 616 and further on channel 628, mobile network 602 and channel 630. The answering machine application 612 records incoming voice message 636 from a remote subscriber 638 via channel 630, mobile network 602, channel 628 through the audio mixer of the operating system 616 and then via channels 624 and 626.

Upon completion of the message to the remote caller 638, the answering machine application 612 issues a call end command in the form of a button 648 state change signal via the Bluetooth interface 642 and Bluetooth network 652 to the audio speaker 662 via channels 646, 658 and 670 to the state button change agent 678.

Next, the button state change agent 678 processes this command, prepares a corresponding message about the change in the button state in action 672 and transmits it via channel 676. As a result, an authentic message confirming the change in the state of the button 674 is transmitted towards the smartphone 622 via channel 664 via the Bluetooth network 652 and the Bluetooth interface 642 of the smartphone 622 and then through channels 654, 644 and 640 to the telephone mobile client application 632. The telephone mobile client application 632 determines the received message 650 as a user command to end the call 650 and, accordingly, ends the call from the remote subscriber of the telephone network 638.

In this case, in fact, a simulation of a change in the state of a button occurs, which physically does not exist and, accordingly, the physical state of which does not change, but only a message about the corresponding event is generated.

Figure 7:
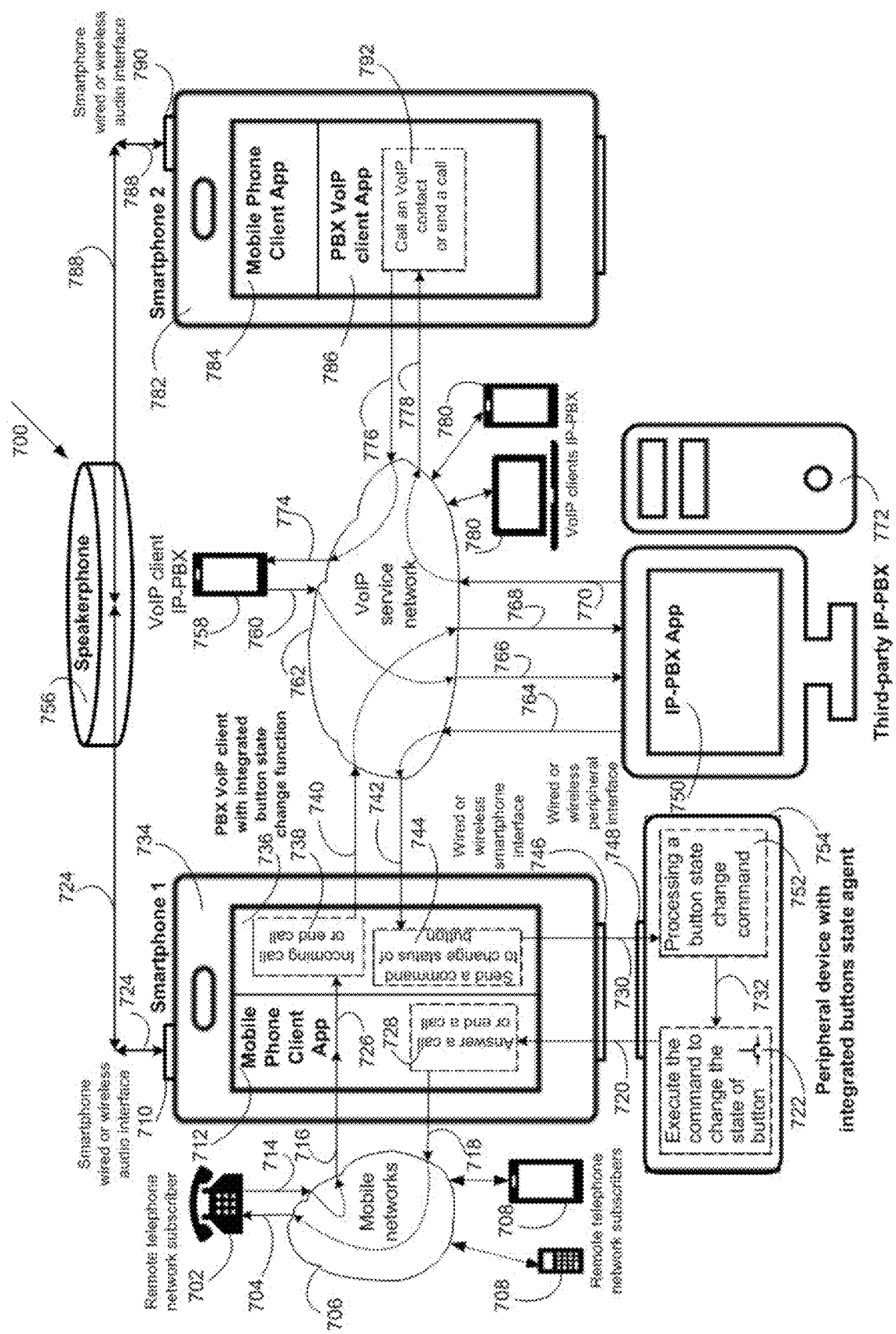
FIG. 7 Illustrates an example implementation for an aspect and variants of the method of interaction between managed applications of mobile phone clients and VoIP smartphone clients and an IP-PBX management application installed on a desktop computer through the IP-PBX management application's access to a smartphone peripheral button state change agent.

FIG. 7 illustrates an example implementation for an aspect and embodiments of a method of interaction between smartphone applications and computer applications of any type, where an application installed on a computer controls an application installed on a smartphone through the control application's corresponding access to a peripheral device button state change agent connected to the smartphone, and the controlled smartphone application contains a user interface in the form of the same buttons on a peripheral device connected to a smartphone.

FIG. 7 provides an illustration of an example of the operation of a telephone mobile client application and a VoIP client application installed on various smartphones under the control of an IP-PBX application installed on a desktop computer in the following scenario.

After an incoming telephone call to the first smartphone from a remote subscriber of the telephone network, the VoIP client installed on the second smartphone calls the previously defined remote VoIP client IP-PBX. After the end of the conversation between the remote telephone network subscriber and the remote IP-PBX client, the call ends.

To most fully understand the essence of the invention, the example describes the simplest scenario of a method of interaction between managed smartphone applications and a computer control application in the form of interaction between an IP-PBX and its clients. In general, the example in FIG. 7 contains an illustration of the functioning of the VoIP-Cell gateway between the mobile telephone network and the VoIP service network managed by IP-PBX, which also includes connection procedures between internal VoIP clients. It is clear that other more complex scenarios can be used in the above example.

Previously, the smartphone 734 is connected to the peripheral device 754 by the same type of interfaces 746 and 748. These interfaces can be any type of interface, that is, wired or wireless, and digital or analog. Both smartphones 734 and 782 are connected to the wireless VoIP network of the service 762 IP-PBX 772 and, through VoIP clients 736 and 786, have the ability to communicate with other VoIP clients 758 and 780 IP-PBX 772. VoIP client 736, installed on smartphone 734, has an additional a function to change the state of a button in a peripheral device 754 connected to a smartphone 734. The telephone mobile client 784 of a smartphone 782 does not participate in the processes illustrated in FIG. 7.

The telephone mobile client 712 of the smartphone 734 is registered in the telephone mobile network 706 and can receive calls from remote telephone subscribers 702 and 708. In addition, the smartphones 734 and 782 are connected to the speakerphone 756 for mutual voice transmission through their interfaces 710 and 790. These interfaces They can also be interfaces of any type, that is, wired or wireless, as well as digital or analog.

Interaction between managed applications 712, 736, 786 and management application 750 with IP-PBX functionality according to the example illustrated in FIG. 7 and the scenario above occurs as follows.

A remote subscriber 702 of the telephone network 706 makes a call to the mobile client 712 of the smartphone 734. The corresponding event is reported via the mobile network 706 via channels 714 and 716 to the telephone mobile client 712 application of the smartphone 734 and then via channel 726 to the VoIP client 736 application with additional a function to change the state of a button in a peripheral device 754 connected to a smartphone 734.

In response to this event, the VoIP client application 736 transmits a telephone call message 738 on channels 740 and 768 through the VoIP service 762 network to the IP-PBX application 750 installed on the desktop computer 772. In response to the call event from the telephone network IP-PBX application 750 generates a command to call the previously defined remote VoIP client 758 IP-PBX 772, which is transmitted via channels 770 and 778 to VoIP client application 786. Application 786 then transmits the call in action 792 through the VoIP service network 762 to VoIP client 758 via channels 776 and 774.

The response event of VoIP client 758 is transmitted as a message through the VoIP service network 762 to the IP-PBX application 750 on channels 760 and 766. Next, the TP-PBX application 750 transmits the command to answer the call of the remote subscriber 702 of the telephone network 706 to the VoIP client application 736 with an additional function for changing the state of a button in a peripheral device 754 connected to a smartphone 734 via channels 764 and 742.

The VoIP client application 736 processes the button state change command on the peripheral device 754 in action 744 and transmits it through interfaces 746 and 748 on channel 730. The button state change agent of the peripheral device 754 processes the incoming command 752 and transmits it for execution 722 on channel 732 As a result, the telephone mobile client application 712 is commanded to answer the incoming call 728 on channel 720 and, accordingly, answers the call of the remote subscriber 702 on channels 718 and 704 through the telephone network 706.

In fact, a situation similar to that is created when the user of the smartphone 734 physically presses the corresponding button to answer the call. After answering the call, the conversational connection between the remote subscriber 702 and the VoIP client 758 IP-PBX 750 is carried out via audio channels between the remote subscriber 702 and the mobile client application 712, then through the audio interface 710 of the smartphone 734 and the speakerphone 756 via channel 724, then via channel 788 and an audio interface 790 of the smartphone 782 to the VoIP client application 786, which already has an audio link with the VoIP client 758 IP-PBX 750.

If a call termination is initiated by the remote subscriber 702 of the telephone network 706, the disconnection procedure occurs as follows.

The corresponding event is reported through the mobile network 706 on channels 714 and 716 to the telephone mobile client application 712 of the smartphone 734, which normally terminates the call on the mobile telephone network. The call completion message is also sent via channel 726 to the VoIP client 736 application.

In response to this event, the VoIP client application 736 transmits a call end message 738 on channels 740 and 768 through the VoIP service 762 network to the IP-PBX application 750 installed on the desktop computer 772. In response to the call end event from the telephone network, the IP-PBX application 750 generates a call termination command to the VoIP client 786 application of the smartphone 782 via channels 770 and 778 through the VoIP service 762 network. Then, in normal mode, the IP-PBX terminates the call between clients 786 and 758 of the IP-PBX 750 application. Accordingly, after the procedure disconnects involved in this connection, the remote subscriber 702 and clients 712, 736, 786, 758 are released and go into a call waiting state.

If a call termination is initiated by the remote VoIP client 758 IP-PBX 772, the disconnect procedure occurs as follows.

A message about the corresponding event is sent through the VoIP service network 762 to the IP-PBX 750 application installed on the desktop computer 772, via channels 760 and 766. The IP-PBX 750 normally terminates the call between its clients 786 and 758. Next, the IP application-PBX 750 sends the call termination command to the VoIP client application 736 with the additional function of changing the state of the button in the 754 peripheral device connected to the 734 smartphone via channels 764 and 742.

VoIP client application 736 processes the button state change command on the peripheral device 754 inaction 744 and transmits it through interfaces 746 and 748 on channel 730. The button state change agent of the peripheral device 754 processes the incoming command 752 and transmits it for execution 722 on channel 732 As a result, the telephone mobile client application 712 is commanded to terminate the call 728 on channel 720 and accordingly terminates the call between the remote subscriber 702 and the telephone mobile client 712 on channels 718 and 704 through the telephone network 706.

In fact, a situation similar to that is created when the user of the smartphone 734 physically presses the appropriate button to end the call. Accordingly, after the release procedure, the remote subscriber 702 and clients 712, 736, 786, 758 involved in this connection are released and go into a call waiting state.

It will be apparent to those skilled in the art that FIG. 7 illustrates a method for controlling any system and application applications of a smartphone with a corresponding application installed on any computer device that has the ability to use an additional user interface implemented on the buttons of peripheral devices connected to smartphones.

Figure 8:
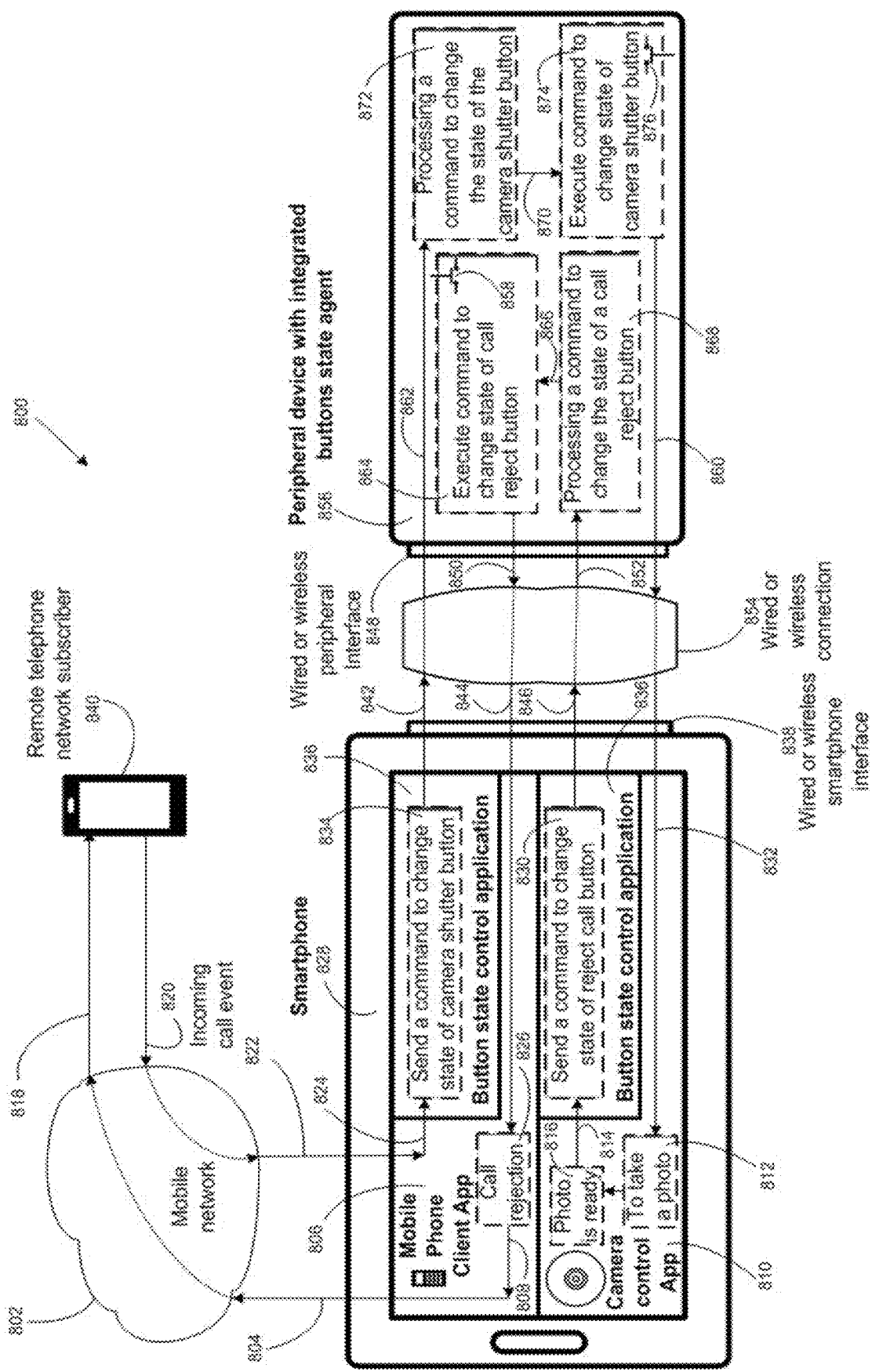
FIG. 8 Illustrates an example implementation for an aspect of the method of interaction between a mobile phone client application and a smartphone camera control application through mutual control of each application's additional user interface.

FIG. 8 illustrates an example implementation for an aspect of a method for interacting two different smartphone computer applications through an additional button user interface on a peripheral device connected to the smartphone, where the first application has the ability to control the state change agent of the second application's additional user interface buttons over the first application's interaction channel and this peripheral device, and accordingly, the second application has the ability to control the agent for changing the state of the buttons of the additional user interface of the first application through the channel of interaction between the second application and this peripheral device.

FIG. 8 contains an illustration of an example of interaction between a mobile phone client application and a smartphone camera control application according to the following scenario. When a phone call is received on a properly configured smartphone, the smartphone's camera automatically takes a photo. After receiving the photo, the incoming call is rejected.

An example is provided for the most complete understanding of the invention. It is clear that in this way, any application, including communication applications, can safely interact under the user's control, synchronizing their actions.

The smartphone 828 has a connection 854 with the peripheral device 856 via the same type of interfaces 838 and 848. These interfaces can be any type of interface, that is, wired or wireless, and digital or analog.

The user mobile phone application 806 of the smartphone 828 on channels 844 and 850 via connection 854 operates with the call reject button 858 of the peripheral device 856, and the user camera control application 810 of the smartphone 828 on channels 832 and 860 via connection 854 operates with the shutter button of the camera 876 856 peripheral device.

It is assumed that the camera control application 810 is already running on the smartphone 828 and is waiting for a command to take a photo. In addition, the smartphone 828 is pre-installed with a button state management application 836 of the peripheral device 856 with a built-in button state change agent.

Interaction between the telephone mobile client application 806 and the camera control application 810 according to the example illustrated in FIG. 8 happens as follows.

A remote subscriber 840 of the telephone network 802 makes a call to the telephone mobile client of the smartphone 806. The corresponding event is reported through the mobile network 802 on channels 820 and 822 to the telephone mobile client application 806 of the smartphone 828 and then to the button state control application 836 on channel 824.

In response to this event, the button state control application 836 transmits a command to change the state of the camera shutter button 876 in action 834 via smartphone interface 838 on channel 842, connection 854, and interface 848 on channel 862 to a peripheral device 856 with a built-in state change agent buttons. Next, the agent for changing the state of the button of the peripheral device 856 processes the incoming command 834 and prepares the corresponding command to change the state of the shutter button of the camera 876 in action 872, which is transmitted for execution in action 874 via channel 870.

Authentic confirmation of the change in the state of the shutter button of the camera 876 as a result of action 874 is transmitted to the smartphone 828 on channel 860 through interface 848, connection 854 to interface 838 of smartphone 828 and then on channel 832 to the camera control application 810. The camera control application 810 determines the received confirmation of the change in the state of the button 876 as a command to the user to take the current photo 812 and, accordingly, takes a photo 816. In fact, a situation is created similar to that when the user physically presses the shutter button of a smartphone camera.

As a result, the button state control application 836, after receiving the photo ready event message 816 on channel 814, transmits a command 830 to change the state of the call reject button 858 through the smartphone interface 838 on channel 846, connection 854 and interface 848 on channel 852 to the peripheral device 856 with a built-in button state change agent. Next, the agent for changing the state of the button of the peripheral device 856 processes the incoming command 830 and prepares the corresponding command in action 868 to change the state of the call reject button 858, which is transmitted to execution 864 via channel 866.

As a result, an authentic confirmation of the change in the state of the call reject button 858 is transmitted towards the smartphone 828 via channel 850 through interface 848, connection 854 to interface 838 of smartphone 828 and then via channel 844 to the telephone mobile client application 806.

The telephone mobile client application 806 defines the received confirmation of the change in the state of the button 858 as a command from the user 826 to reject the incoming call and, accordingly, the call to the remote telephone network subscriber is rejected through the mobile network 802 on channels 808, 804 and 818. In fact, a situation similar to that is created when the user physically presses a smartphone button to reject an incoming call from the mobile phone network.

It will be apparent to those skilled in the art that FIG. 8 illustrates, using the example of smartphones, the way of interaction of any system and application applications installed both on the same computer and on different computers, through the mutual use of an additional user interface implemented on the buttons of peripheral devices connected to computers of any type.

Figure 9:
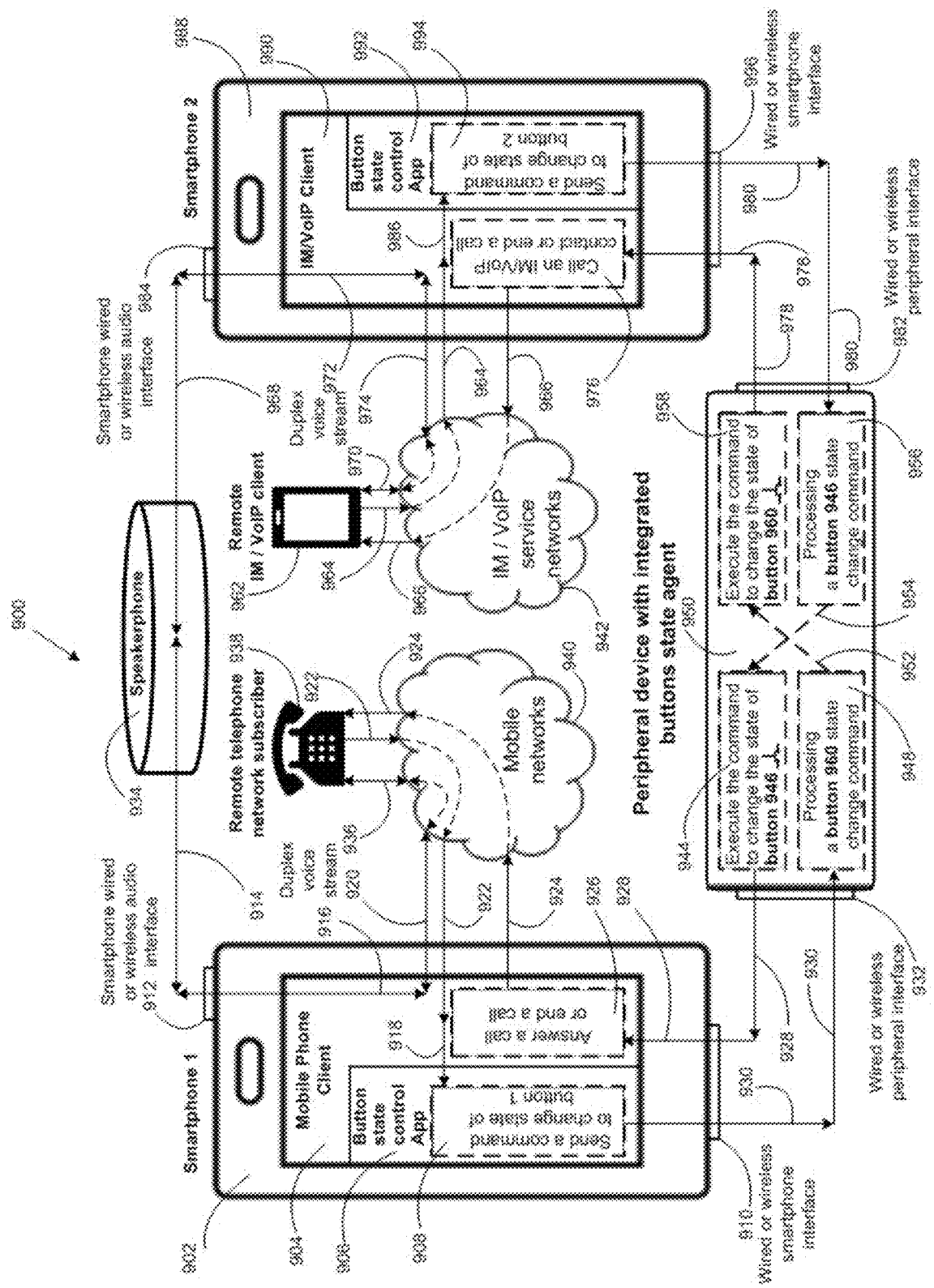
FIG. 9 Illustrates an example implementation for a variant aspect of a method for interacting between mobile phone applications and IM/VoIP client applications through mutual control of each application's additional user interface.

FIG. 9 illustrates an example implementation for an aspect of a method for interacting two different communication applications installed on smartphones through an additional button user interface on a peripheral device connected to the smartphone, where the first voice application is able to make a call, answer a call, and end a call through the user interface of the second communication application voice application, and accordingly the second communication voice application is able to make a call, answer the call and end the call through the user interface of the first communication voice application.

FIG. 9 contains an illustration of an example of interaction between communication applications of mobile phone clients and IM/VoIP service clients installed on various smartphones according to the following scenario.

When a telephone call is received on the first smartphone from a remote subscriber of the telephone network, the IM/VoIP client installed on the second smartphone calls the previously defined remote IM/VoIP client. After a conversation has taken place between the remote telephone network subscriber and the remote IM/VoIP client, the call ends. An example is provided for a more complete understanding of the invention. It is clear that in this way, any application, not just communication applications, can interact safely and under user control, synchronizing their actions.

The smartphone 902 is connected to the peripheral device 950 by the same type of interfaces 910 and 932, and the smartphone 988 is connected to the peripheral device 950 by the same type of interfaces 996 and 982. These interfaces can be any type of interface, that is, wired or wireless, as well as digital or analog. The mobile telephone client 904 of the smartphone 902 is registered in the mobile telephone network 940 and can receive calls from the remote subscriber 938. The IM/VoIP client 990 of the smartphone 988 has the ability to communicate through the network of the IM/VoIP service 942 with the remote IM/VoIP client 962. Installed on both smartphones 902 and 988, button state control applications 906 and 992, respectively, have the function of changing the state of a button in a peripheral device 950 connected to these smartphones.

The command to the IM/VoIP client application 990 to make or end a voice call to the remote IM/VoIP client 962 in action 976 is the result of changing the state of the button 960 in action 958. The command to the telephone mobile client application 904 to answer or end a call to the remote telephone subscriber 938 in action 926 is the result of a change in the state of button 946 in action 944.

Buttons 960 and 946 on peripheral device 950 may be implemented as physical or logical entities with corresponding physical or logical state changes (see the descriptions of FIG. 2 and FIG. 3 for details). In addition, smartphones 902 and 988 are connected via interfaces 912 and 984 to a speakerphone 934 for mutual voice transmission. These interfaces can also be any type of interface, that is, wired or wireless, as well as digital or analog.

Interaction between mobile telephone and IM/VoIP communication applications according to the example illustrated in FIG. 9 and the above scenario occurs as follows.

A remote subscriber 938 of the telephone network 940 makes an incoming call to the telephone mobile client 904 of the smartphone 902. The corresponding event is reported via the mobile network 940 via channel 922 to the telephone mobile client 904 application of the smartphone 902 and then to the button state control application 906 via channel 918. In response to this event, the button state control application 906 transmits a command 908 to change the state of the button 960 on the peripheral device 950 through interfaces 910 and 932 on channel 930.

The agent for changing the state of the button of the peripheral device 950 processes the incoming command 948 and transmits it for execution 958 via channel 952. As a result, the application IM/VoIP client 990 of the smartphone 988 receives a command to make a voice call to the remote IM/VoIP client 962 and, accordingly, calls the remote IM/VoIP client 962.

After the remote IM/VoIP client 962 responds, IM/VoIP client 990 receives a corresponding message on channel 964. This message is also broadcast to the button state control application 992 on channel 986. In response to this event, the button state control application 992 sends a command 994 changes the state of the button 946 on the peripheral device 950 through interfaces 996 and 982 on channel 980.

The agent for changing the state of the button of the peripheral device 950 processes the incoming command 956 and transmits it for execution 944 via channel 954. As a result, the application of the telephone mobile client 904 of the smartphone 902 receives the command to answer and, accordingly, answers the call of the remote telephone subscriber 938. In fact, a situation is created similar to when the user of the smartphone 902 physically presses the appropriate button to answer an incoming call.

After answering an incoming call, the conversational connection between the remote subscriber 938 and the remote IM/VoIP client 962 is carried out over audio channels between the remote subscriber 938 and the telephone mobile client application 904 via channel 936, mobile network 940, then via channels 910 and 916 via audio interface 912 of smartphone 902 and speakerphone 934 via channel 914, then via channel 968 and audio interface 984 of smartphone 988 to the IM/VoIP client 990 application via channel 972, which has audio channels 974 and 970 with remote IM/VoIP client 962 via the service network IM/VoIP 942.

If the call is terminated by the remote subscriber 938 of the telephone network 940, the disconnection procedure occurs as follows.

The corresponding event is reported via the mobile network 940 on a channel 922 to the telephone mobile client application 904 of the smartphone 902, which normally terminates the call on the mobile telephone network. The call completion message is also sent to the button state control application 906 via channel 918.

In response to this event, the button state control application 906 transmits a command 908 to change the state of the button 960 on the peripheral device 950 through interfaces 910 and 932 via channel 930. The button state change agent of the peripheral device 950 processes the incoming command 948 and transmits it for execution 958 on channel 952.

As a result, the IM/VoIP client 990 application of the smartphone 988 receives a command 976 to end the call via channel 978 through interfaces 982 and 996 and, accordingly, ends the call to the remote IM/VoIP client 962 via channel 966 through the IM/VoIP service network 942. Accordingly, After the release procedure, the remote subscriber 938 and clients 904, 990, 962 involved in this connection are released and go into a call waiting state.

If the call is terminated by the remote IM/VoIP client 962 of the IM/VoIP service 942 network, the disconnection procedure occurs as follows.

After the call is completed by the remote IM/VoIP client 962, the IM/VoIP client 990 receives a corresponding message on channel 964 through the IM/VoIP service network 942. This message is also broadcast to the button state control application 992 on channel 986.

In response to this event, the button state control application 992 transmits a command 994 to change the state of the button 946 on the peripheral device 950 through interfaces 996 and 982 via channel 980. The button state change agent of the peripheral device 950 processes the incoming command 956 and sends it for execution 944 on channel 954.

As a result, the telephone mobile client application 904 of the smartphone 902 receives a command 926 to end the call via channel 928 through interfaces 932 and 910 and, accordingly, ends the call with the remote telephone subscriber 938 via channel 924 via the mobile network 940. In fact, a situation similar to that is created when the user of the smartphone 902 physically presses the appropriate button to end the call. Accordingly, after the release procedure, the remote subscriber 938 and clients 904, 990, 962 involved in this connection are released and enter the call waiting state.

It will be apparent to those skilled in the art that FIG. 9 illustrates a method for secure interaction under user control not only of communication mobile applications, but also of any system and application applications for any computers with different operating systems.

Figure 10:
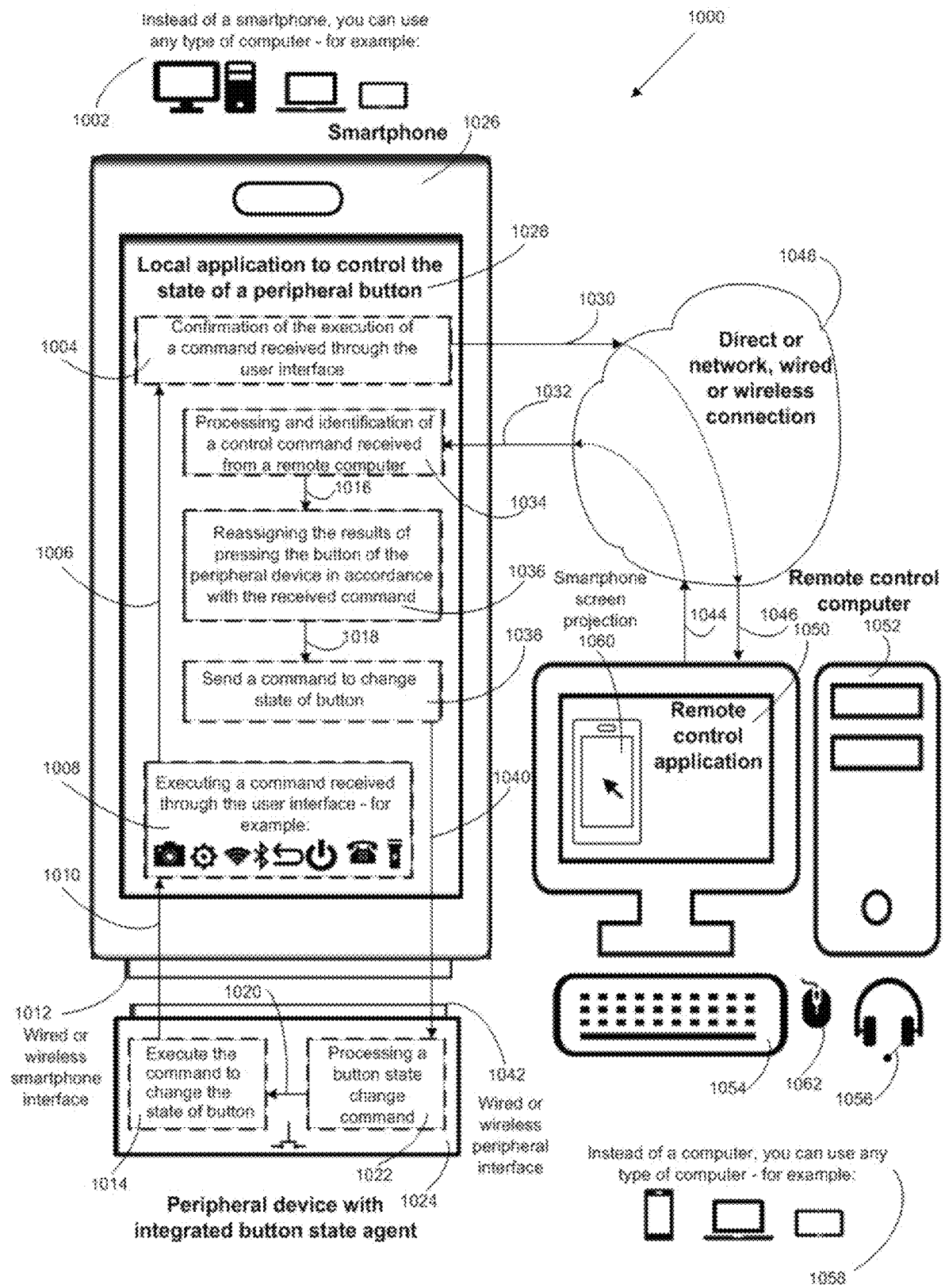
FIG. 10 Illustrates an example of the implementation of a method and relevant aspects of remote control of a smartphone with an additional user interface in the form of buttons on a peripheral device without direct tactile communication with the smartphone user.

FIG. 10 illustrates an example of the implementation of a method for remote control of a computer of any type using the example of a smartphone without tactile communication with the user, which includes some relevant aspects.

In fact, FIG. 10 contains an example of a remote computer controlling the functions of a smartphone with an additional user interface in the form of buttons on a peripheral device without tactile communication with the smartphone user according to the following interaction scheme.

The managed smartphone 1026 includes a local application 1028 for controlling the state of a button on the peripheral device 1024, which in turn is controlled by a corresponding application 1050 of the remote computer 1052. The remote management computer 1052 and the managed smartphone 1026 are connected directly or through a corresponding network 1048. Thus, the remote computer 1052 manipulates the user interface of the smartphone 1026 by changing the state of the button of the peripheral device 1024. The control computer 1052 can be any type of computer. For example, 1058, smartphone, tablet, laptop, etc.

It is clear that in a similar way, using the manipulation of the buttons of the additional interface of the smartphone without tactile participation of the user, it is possible to remotely and safely control the user interface of any type of computer 1002 under the control of the user.

The smartphone 1026 is connected to the peripheral device 1024 by the same type of interfaces 1012 and 1042. These interfaces can be any type of interface, that is, wired or wireless, and digital or analog. A local peripheral button state control application 1028 installed on a smartphone 1026 has the function of changing the button state in a peripheral device 1024 with a built-in button state change agent connected to that smartphone 1026.

A remote computer 1052 with a corresponding management application 1050 is connected directly or via a network 1048 to a managed smartphone 1026. Remotely controls the user interface of the smartphone 1026 according to the example illustrated in FIG. 10 and the interaction diagram above occurs as follows.

The remote user of the smartphone 1026, through the user interface of the remote control application 1050 of the computer 1052, transmits in message format to the local state control application of the peripheral button 1028 of the smartphone 1026 a command to perform some action that the user could physically perform directly using the user interface of the smartphone, This command is transmitted in message format via channels 1044 and 1032 via connection 1048 to the application 1028 of the smartphone 1026. The application 1028 then processes and identifies in action 1034 the received command from the remote computer 1052. The command identification value is then transmitted via channel 1016 to reassign the results of the click buttons in action 1036 of the peripheral device 1024 in accordance with the value of the received command from the remote computer 1052.

After reassigning the results of pressing the button 1036, the local application for controlling the state of the peripheral button 1028 via channel 1018 transmits for execution a command to change the state of the button in action 1038 and then through interfaces 1012 and 1042 via channel 1040 to the peripheral device 1024. The agent for changing the state of the button of the peripheral device 1024 processes the incoming command in action 1022 and transmits it for execution to action 1014 via channel 1020.

As a result, the corresponding application or operating system of the smartphone 1026, through an additional user interface in the form of a button of the peripheral device 1024 via channel 1010, receives a command in accordance with the already reassigned result of pressing the button of the peripheral device 1024 and the received command from the remote computer 1052 and, accordingly, executes this command in action 1008.

In fact, a situation similar to that is created when the user of the smartphone 1024 directly physically controls the corresponding functions of the user interface of the smartphone. For example, in remote access mode, you can perform actions such as answering and ending a phone call, launching applications, navigating (going back to the home screen), performing system functions (turning on and off the flashlight, Wi-Fi, camera, microphone) and so on.

Next, via channel 1006, the application 1028 of the smartphone 1026 goes into the state of transmitting to the remote application 1050 of the computer 1052 confirmation of the execution of the remotely received command in action 1004, which is transmitted via channels 1030 and 1046 through connection 1048.

This example shown in FIG. 10 also includes, in addition to illustrating the method of remotely controlling a smartphone with an additional user interface in the form of buttons on a peripheral device, also illustrating some of its aspects.

One aspect comprising the dynamic reassignment in action 1036 by the local application 1028 of the controlled smartphone 1026 of the results of the action of the button of the peripheral device 1024 to the desired results each time in accordance with the next received control command of the user interface in the action 1034 of the smartphone 1026 from the control application 1050 of the remote computer 1052.

Thus, pre-setting to synchronize the results of the peripheral device buttons with the desired results of the commands received from the control application 1050 of the remote computer 1052 is carried out in actions 1034 and 1036.

In addition, to remotely control the functions of the user interface of the smartphone 1026, you can use only one button of the additional user interface of the peripheral device 1024 with the corresponding properties, since it is possible dynamically in actions 1034 and 1036, after each state change (press) of one and the same button of the peripheral device 1024 to receive a new result of the action 1008 of the user interface of the managed smartphone 1026 by a new preliminary reassignment in the action 1036 by the local application 1028 of the smartphone 1026 of the result of the action of pressing this button to a new result of the action each time in accordance with the next received command 1034 of the remote control of the user interface smartphone 1026.

Another aspect comprising controlling the user interface of a smartphone in accordance with remote user commands received through a screen projection of the user interface 1060 of the smartphone 1026 displayed on the screen of a remote control computer via communication channels 1044 and 1032 from the computer 1052 using a graphical interface input device 1062 (mouse). The on-screen user interface is projected onto the control computer monitor via channels 1030 and 1046 as a result of interaction between the local smartphone application 1028 and the remote control application 1050.

It is understood that communication channels 1032 and 1044, 1030 and 1046 may be implemented over any type of network infrastructure or direct connection 1048.

Application 1028 processes and identifies in action 1034 an incoming command through a screen projection of user interface 1060 using system or other software tools. The command identification value is then transmitted over channel 1016 to reassign the results of pressing button 1036 of peripheral device 1024 according to the value of the received command from the remote user. Next, the procedure for remote control of the user interface of the smartphone 1026 is performed according to the algorithm described above.

Two further aspects include controlling the user interface of the smartphone 1026 in accordance with the remote user's voice and text commands received over communication channels 1044 and 1032 from the remote user's computer 1052 using the microphone 1056 and keyboard 1054, respectively.

It is understood that communication channels 1032 and 1044 with a corresponding remote user device can be implemented through any type of network infrastructure or direct connection 1048. For example, through IM/VoIP services or mobile telephony.

Application 1028 processes and identifies in action 1034 an incoming voice or text command using system or other software tools. The command identification value is then transmitted over channel 1016 to reassign the results of pressing button 1036 of peripheral device 1024 according to the value of the received command from the remote user. Next, the procedure for remote control of the user interface of the smartphone 1026 is performed according to the algorithm described above.

Figure 11:
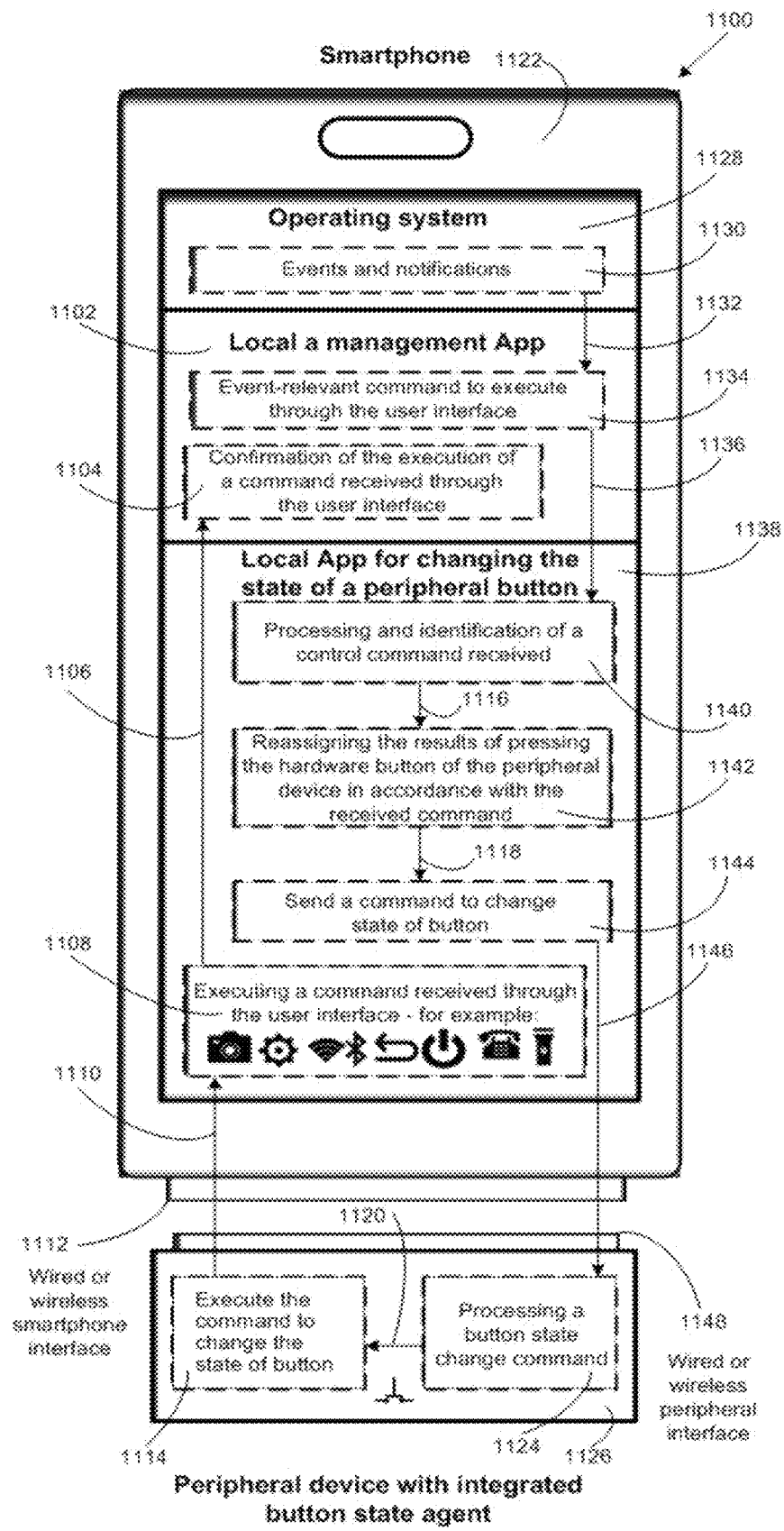
FIG. 11 Illustrates an implementation example for an aspect of a smartphone control method that includes local smartphone control, where all additional user interface control functions are implemented directly on the hardware and software platform of the same smartphone in an automatic manner without direct tactile input from the user.

FIG. 11 illustrates an example implementation for an aspect of a method for remote control of a computer of any type using the example of a smartphone with an additional user interface in the form of buttons on a peripheral device without tactile communication with the user, which contains local control of the smartphone, when the functions of the local application and the control application are implemented directly on the hardware and software platform of the same smartphone to control the user interface of the smartphone directly only using the software of this smartphone in automatic mode without tactile user participation.

In fact, FIG. 11 contains an example of the implementation of automatic control of a smartphone through its additional user interface in the form of buttons on a peripheral device, depending on external and internal events recorded by the operating system and sensors of the smartphone, as well as other applications without tactile communication with the user according to the following interaction scheme.

The controlled smartphone 1122 includes a local application 1138 for changing the state of a button on the peripheral device 1126, which in turn is controlled by the corresponding local application 1102 of the smartphone 1122. The control application 1102 generates various commands for the application 1138 and accordingly for the user interface of the smartphone 1122 depending on context of incoming events and notifications via channel 1132 through the operating system 1128 from other applications and sensors of the smartphone 1122.

Thus, the control application 1102, in accordance with logic previously defined by the user, to determine the circumstances of processing incoming events and notifications through channels 1132 through the operating system 1128 from other applications and sensors of the smartphone 1122 manipulates the user interface of the smartphone 1122.

It is clear that the interaction diagram of software and hardware components for controlling the user interface of a smartphone is given as one of the possible examples of corresponding implementations for a more complete understanding of the essence of the invention.

The smartphone 1122 is connected to the peripheral device 1126 by the same type of interfaces 1112 and 1148. These interfaces can be any type of interface, that is, wired or wireless, and digital or analog. A local button state change application 1138 installed on a smartphone 1122 has a button state change function in a peripheral device 1126 with a built-in button state change agent connected to that smartphone 1122.

The local control application 1102 is also installed on this smartphone 1122, which, in accordance with the user's pre-configured parameters for processing the context of incoming messages about events and notifications, transmits control commands for the user interface of the smartphone 1122 to the application 1138. For example, events about incoming messages can be processed, call, receipt of SMS, alarm clock, triggering of various built-in sensors and many other events with corresponding notifications.

Automatic control of the user interface of the smartphone 1122 without tactile user input according to the example illustrated in FIG. 11 and the interaction diagram above occurs as follows.

The control application 1102 receives, through the operating system 1128 via channel 1132, an event message that corresponds to a command 1134 for the smartphone user interface in accordance with the preliminary user settings of the application 1102 regarding the parameters of the reaction logic to this event, and then transmits this data via channel 1136 a command in the format of a message to the local application changing the state of the peripheral button 1138 of the smartphone 1122.

Next, application 1138 processes and identifies the command in action 1140 received on channel 1136. The command identification value is then transmitted on channel 1116 to reassign the button press results of peripheral device 1126 in action 1142 according to the value of the received command from local control application 1102.

After the button press results are reassigned in action 1142, the button state change application 1138 on channel 1118 transitions to the state of sending a button state change command 1144 through interfaces 1112 and 1148 on channel 1146. The button state change agent of the peripheral device 1126 processes the incoming command in the action 1124 and transmits it for execution to action 1114 via channel 1120.

As a result, the corresponding application or operating system of the smartphone 1122, through an additional user interface in the form of a button of the peripheral device 1126 via channel 1110, receives a command in accordance with the already reassigned result of pressing the button of the peripheral device 1126 and the received command from the local control application 1102 and, accordingly, executes this command in action 1108.

In fact, a situation similar to that is created when the user of the smartphone 1122 directly physically controls the corresponding functions of the user interface of the smartphone. For example, in response to incoming events and notifications 1130 in accordance with preliminary user settings, you can perform actions 1108 such as answering and ending a phone call, launching applications, navigating (go back to the home screen), and performing system functions (turning on and off the flashlight, Wi-Fi, camera, microphone) and much more.

Next, through channel 1106, the application 1138 of the smartphone 1122 transmits to the local control application 1102 confirmation of the execution of the received command in action 1104, and goes into a state of waiting for the next command to control the user interface of the smartphone 1122 from the control application 1102.

Figure 12:
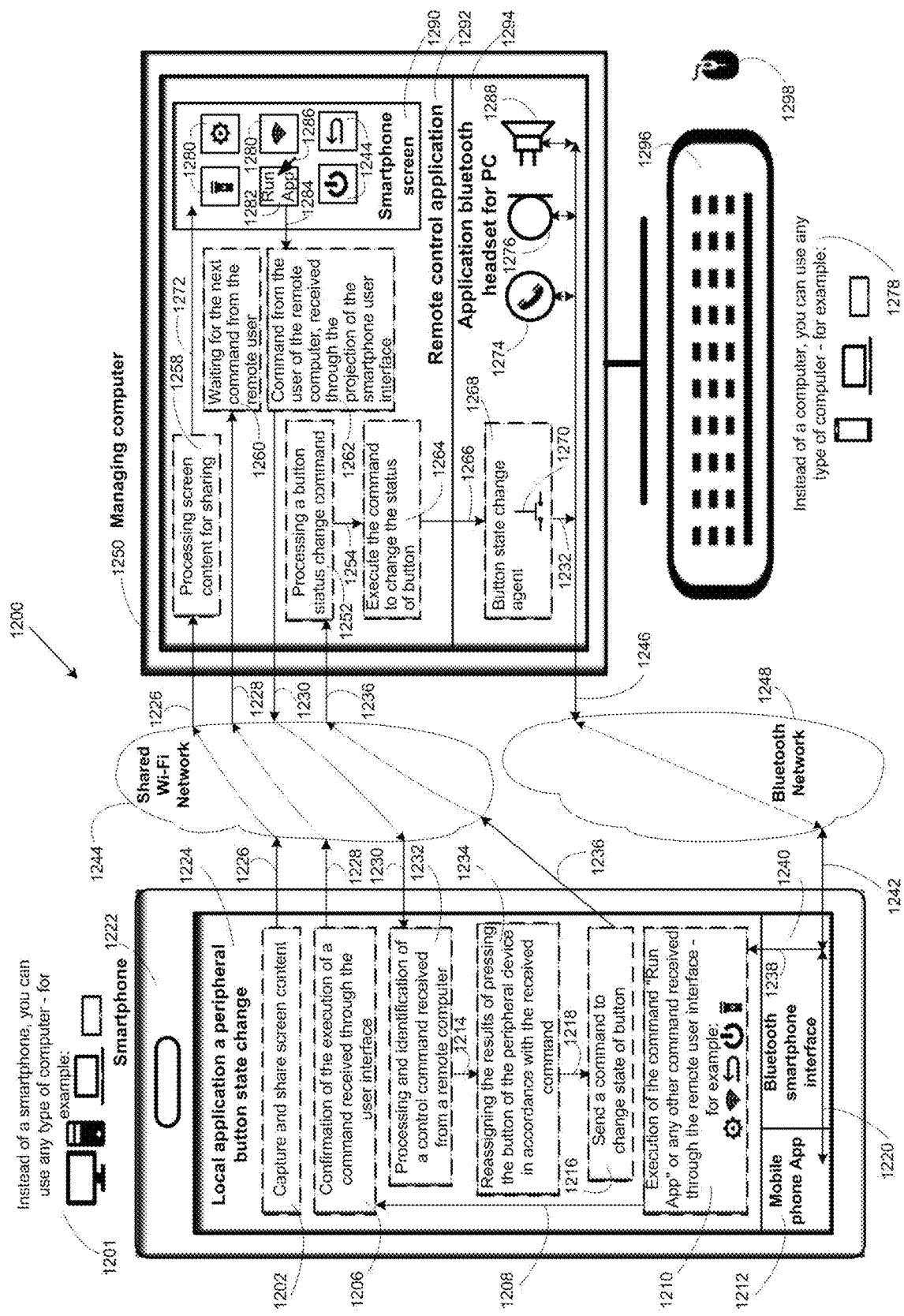
FIG. 12 Illustrates an implementation example for an aspect and variant of a method for remotely controlling a smartphone using the user interface of a host computer when the smartphone and computer are operated simultaneously and are physically accessible to the same user.

FIG. 12 illustrates an example implementation for an aspect of a method for remotely controlling a smartphone 1222 without tactile communication with a user of the smartphone 1222 through the user interface of a remote control application 1292 installed on a computer 1250 of any type 1278, when the smartphone 1222 and the given computer 1250 are operated simultaneously by the same user and are located within the physical reach of the same user.

Instead of a 1222 smartphone, you can use any type of computer. For example, 1201, desktop computer, laptop, tablet, etc.

That is, the claimed invention allows the user, using simple applications 1224 and 1292 installed on the smartphone 1222 and computer 1250, respectively, without interrupting work with the user interface of the computer 1250, which is more ergonomic and easy to use than the interface of the smartphone 1222, to use Smartphone user interface functions 1222 directly on the computer monitor 1250.

The procedure for controlling the user interface of the smartphone 1222 using the user interface of the host computer 1250 in the case of projecting the screen interface of the smartphone 1290 on the monitor of the computer 1250 is illustrated in detail in FIG. 12 for a variant of this aspect where the peripheral device of the controlled smartphone 1222 is in the form of a wireless Bluetooth headset 1294, including a button state change agent 1268 and implemented by software and hardware of the controlling computer 1250 directly on the basis of this computer 1250, including a microphone 1276 and a speaker 1288.

The software headset 1294, which is paired with the Bluetooth interface 1240 of the smartphone 1222 via channels 1246, 1242, 1220 via the Bluetooth network 1248, interacts with the mobile phone application 1212 like any other Bluetooth hardware headset, using the microphone 1276 and speaker 1288 of the computer 1250, as well as a call manipulation button 1274 of the headset application GUI 1294.

The button state change agent 1268 and the corresponding virtual button 1270 are controlled directly by the application 1292 of the control computer 1250 through internal channels 1266 of that computer. The event of "pressing" the button 1270 at the command of the application 1292 is processed within the Bluetooth protocol as if the user himself physically pressed the corresponding button, taking into account the previously assigned result of the action of this button in action 1234.

The local peripheral button state change application 1224 installed on the smartphone 1222 and the remote control application 1292 of the computer 1250 interact via a shared Wi-Fi network 1244. The screen projection of the smartphone 1290 is first broadcast to the computer monitor 1250 after the screen of the smartphone 1222 is captured in action 1204 over channel 1226 and the shared Wi-Fi network 1244. Next, action 1258 processes the received screen content for sharing and then projects the smartphone screen 1290 over channel 1272 directly onto the computer monitor 1250.

Remotely control the user interface of the smartphone 1222 through the projection of its screen on the monitor of the control computer 1250 according to the example illustrated in FIG. 12 and the interaction diagram above occurs as follows.

The user of the computer 1250, through the user interface of the remote control application 1292 in the form of a projection of the screen 1290 of the smartphone 1222, expects to launch the mobile application 1282 of the smartphone 1222 using the computer mouse 1298 or keyboard 1296 of the remote control computer 1250, placing the mouse pointer 1286 on the corresponding element of the graphical interface-icon applications 1282.

Next, the computer user presses the corresponding key of the computer mouse 1298 or keyboard 1296. Information about this event is received by the application 1292 via channel 1284. As a result, a command 1262 is generated, received through the projection of the user interface of the smartphone with the corresponding parameters of the launched application 1282.

Next, command 1262 via channel 1230 is transmitted via a common Wi-Fi network 1244 to the local application for changing the state of the button of the peripheral device 1224 of the smartphone 1222. Action 1232 processes and identifies the control command to launch the application 1282 received from the computer 1250.

Next, the command to control the user interface (launch application 1282) of the smartphone 1222 with the corresponding parameters via channel 1214 is received to reassign the results of pressing the button of the smartphone peripheral device in accordance with the parameters of this command to launch the application 1282 in action 1234. After these actions, the result of any press buttons 1270 will be identified by the smartphone user interface 1222 as the result assigned in action 1234.

Next, the application 1224 goes into the state of generating a command to change the state of the button in action 1216 via channel 1218 and then transmits this command to the control application 1292 of the computer 1250 via channel 1236 via the shared Wi-Fi network 1244. Then in action 1252 the control application 1292 processes command to change the state of the button and, through channel 1254, transmits this command for execution to action 1264 to change the state of button 1270 by the button status change agent 1268.

As a result, the corresponding application or operating system of the smartphone 1222 through an additional user interface in the form of a button 1270 of the software headset 1294 on channels 1256 and 1246 via the Bluetooth network 1248, the Bluetooth interface 1240 of the smartphone 1222 and channels 1242, 1238 receives a command in accordance with the already reassigned the result of pressing the button of the peripheral device 1294 to launch the application 1282 and, accordingly, executes the given command in action 1210.

In a similar manner, any element of the graphical interface of the smartphone 1222 can be activated remotely through the projection of the screen 1290. For example, any graphical element 1280 in accordance with the actions 1210.

Next, via channel 1208, the application 1224 of the smartphone 1222 goes to state 1206 to transmit to the remote application 1292 of the computer 1250 confirmation of the execution of the remotely received command, which is transmitted via channel 1228 via the shared Wi-Fi network 1244. After which, in action 1260, the application 1292 goes to state of waiting for the next command from the remote user.

Using the principles of remote control outlined in the comments to FIG. 12, you can organize remote access to the user interface of any type of computer (1201).

It is clear that any peripheral devices, with any interfaces for connecting to a smartphone, with any number of buttons for the additional interface of the corresponding user application can be used within the framework of the claimed invention. It is also clear that interaction architectures or models for remote control of devices and applications can be anything. The main thing is that the principles contained in the claims can be used to develop user devices with new useful properties.

Thus, a new ecosystem is offered to users and developers for safe and useful manipulation of the user interface of smartphones and other computers of any type.

It should be understood that the descriptions and drawings of possible implementations given above are intended to illustrate possible implementations of the claimed inventions in order to best describe the principles of the inventions and their practical application. It is clear that many other embodiments of the claimed inventions will be apparent to those skilled in the art upon reading the above description. Therefore, the present invention is limited only by the following claims and their equivalents, but is not limited by the foregoing description.

We claim:

1. A method of controlling a state of buttons of peripheral devices of computers without a user physically pressing on the buttons of the peripheral devices to provide additional user interfaces, the method comprising:

providing an agent of state change of buttons on a peripheral device of a computer, the peripheral device including buttons to be physically pressed by the user, the agent being built in or programmed directly into the peripheral device of the computer and being controlled by software of the computer;

transmitting a command from the computer to the agent of the state change of the buttons via a channel of interaction of the computer and the peripheral device using the software of the computer;

in response to receipt of the command, transmitting a signal by the agent of the state of change to the peripheral device to change the state of at least one button of the peripheral device;

in response to the change of the state of the at least one button of the peripheral device caused by the signal, transmitting, from the peripheral device to the computer, a message or an electrical signal indicative of the state of change of the at least one button of the peripheral device; and in response to receipt of the message or the electrical signal, controlling a segment of a user interface of the computer corresponding to functions of the at least one button associated with the agent using the software of the computer and without the user pressing the buttons of the peripheral device.

2. The method according to claim 1, further comprising changing the state of the buttons on the peripheral devices connected to the computer response to transmission of the command in a format of an analog electrical signal to an output of an audio interface of the computer using the software of the computer.

3. The method according to claim 1, further comprising changing the state of the buttons on the peripheral devices connected to the computer in response to transmission of the command in a message format using the software of the computer via a digital interface connecting the computer and the peripheral device.

4. The method according to claim 1, further comprising physically changing the state of the button on the peripheral device of the computer using a hardware electrical key that is contained in the agent of the state change of the buttons for physically closing and opening contacts of the at least one button on the peripheral device of the computer.

5. The method according to claim 1, further comprising a logical change in the state change of the at least one button of the peripheral device of the computer using a transmission of a message generated by the agent of the state change of the buttons about an event of a change in the state of the at least one button on the channel of interaction of the peripheral device and the computer.

6. The method according to claim 1, further comprising changing the state of the buttons on the peripheral devices connected to the computer via a wire analog interface.

7. The method according to claim 1, further comprising changing the state of the buttons on the peripheral devices connected to the computer via a wire digital interface.

8. The method according to claim 1, further comprising changing the state of the buttons on the peripheral devices connected to the computer via a wireless interface.

9. The method according to claim 1, further comprising controlling the state of the buttons on the peripheral devices connected to computers of any type.

10. A method of interaction between applications installed on computers, with an additional user interface in a form of buttons on peripheral devices connected to computers without the user pressing the buttons of the peripheral devices, the method comprising:
the peripheral device configured to operate according to the method of claim 1, connected to the computer and including buttons configured to control the software of the computer; and
controlling an application of the computer containing the user interface in the form of the buttons on the peripheral device by changing the state of the buttons via a software of another application of the computer and the agent of the state change of the buttons of the peripheral device on the channel of interaction of the computer and the peripheral device without the user pressing the buttons of the peripheral device.

11. The method according to claim 10, further comprising an interaction between different applications of the computer installed on the computer.

12. The method according to claim 10, further comprising an interaction between different applications of the computer installed on different computers.

13. The method according to claim 10, further comprising an interaction between different applications of a smartphone when one of the applications controls another of the applications via access of the controlling application to the agent of state change of buttons of the peripheral device connected to the smartphone on the channel of interaction of the smartphone and the peripheral device, and the controlled application is contained by the user interface in a form of identical buttons on the peripheral device connected to the smartphone.

14. The method according to claim 13 corresponding controlling applications of a mobile phone and an IM/VOIP client of the smartphone to implement voice answering machine functions using a respective one of the applications for controlling a call answer button and end the call button located directly on the peripheral device.

15. The method according to claim 14, further comprising integrating the agent of state change of buttons directly into an audio headset connected to the smartphone as the peripheral device to implement the voice answering machine functions when using a voice communication application.

16. The method according to claim 14, further comprising integrating the agent of state change of buttons directly into an audio speaker connected to the smartphone as the peripheral device to implement the voice answering machine functions when using a voice communication application.

17. The method according to claim 13, further comprising an interaction between the applications of the smartphone and the applications of the computer of any type when the application installed on the computer controls the application installed on the smartphone through an access of the controlling application to the agent of state change of buttons of the peripheral device connected to the smartphone on the channel of interaction of the computer and the peripheral device and the controlled application of the smartphone is contained by the user interface in a form of identical buttons on the peripheral device connected to the smartphone.

18. The method according to claim 17, further comprising an interaction of a PBX application installed on the computer of any type with communication voice applications of the smartphone when the PBX application, in communication with the software of the smartphone, is permitted to make a call, to answer the call and to complete the call via the user interface of the communication voice applications by controlling the agent of state change of buttons of the peripheral devices working with the communication voice applications on the channel of interaction of the PBX application and the peripheral devices.

19. The method according to claim 18, further comprising an interaction when the controlled application with functions of an IMVoIP client installed on the smartphone, and the controlled application of a mobile phone are clients of a management application with PBX functions which, via the PBX, carry out mutual communication and communication with other clients of networks of available PBX.

20. The method according to claim 18, further comprising an interaction when controlled application of a mobile phone and the controlled application of a VOIP client of the smartphone are a part of a VoIP-Cell gateway of the controlled PBX for transmitting a voice call between the applications and other clients of networks of available PBX.

21. The method according to claim 10, further comprising an interaction of two different applications installed on computers of any type via the additional user interface in a form of the buttons on the peripheral devices connected to computers, when a first application controls the agent of state change of buttons of the peripheral device working with a second application on the channel of interaction of the first application and this peripheral device and respectively the second application controls the agent of state change of buttons of the peripheral device working with the first application on the channel of interaction of the second application and the peripheral device.

22. The method according to claim 21, further comprising an interaction of two different communication voice applications installed on computers of any type when a first communication voice application makes a call, answers the call and completes the call via the user interface of a second communication voice application, and respectively the second communication voice application makes a call, answers the call and completes the call via the user interface of the first communication voice application.

23. A method for remotely controlling a computer of any type with an additional user interface in a form of buttons on a peripheral device without the user pressing the buttons of the peripheral device, the method comprising:
using the peripheral device connected to the controlled computer with a built-in agent of the state change of buttons configured to operate according to the method of claim 1 for controlling the state of buttons of the peripheral device and the segment of the user interface of the controlled computer via the software of a local application of the controlled computer through the agent of the state change of buttons which is built into the peripheral device, on the channel of interaction of the controlled computer and the peripheral device, in accordance with the commands received on communication channels from the controlling application of a remote computer of any type without the user of the controlled computer pressing the buttons of the peripheral device.

24. The method according to claim 23, further comprising a dynamic reassignment by sources of the software of the controlled computer of results of operation of the button of the peripheral device for results of interaction with the user interface in accordance with a control command of the user interface of the controlled computer from the controlling application of the remote computer without the user of the controlled computer pressing the buttons of the peripheral device.

25. The method according to claim 23, further comprising controlling the state of the buttons of the peripheral device and the segment of the user interface of the controlled computer using the software of a local application of the computer in accordance with commands of the remote user arriving on the corresponding communication channels through a projection of a screen of the user interface of the controlled computer shown on a screen of the remote controlling computer and used to manipulate the user interface of the controlled computer by the remote user in real time.

26. The method according to claim 23, further comprising controlling the state of the buttons of the peripheral device and the segment of the user interface of the controlled computer via the software of a local application of the computer according to voice commands of the remote user received via the communication channels.

27. The method according to claim 23, further comprising controlling the state of the buttons of the peripheral device and the segment of the user interface of the controlled computer via the software of a local application of the computer according to text commands of the remote user received via the communication channels.

28. The method according to claim 23, further comprising local control of the computer of any type when functions of a local application and the controlling application are implemented directly on the computer to control the user interface of the computer directly only via the software of this computer in an automatic mode and without the user pressing the buttons of the peripheral device.

29. The method according to claim 23, further comprising controlling a smartphone without the user of the smartphone pressing the buttons of the peripheral device via the user interface of the controlling application installed on the computer of any type when the smartphone and the computer are operated simultaneously and are physically accessible by the user.

30. The method according to claim 29, further comprising a peripheral device of the controlled smartphone with a built-in agent of state change of buttons implemented via software and hardware of a controlling computer of any type connected to the controlled smartphone through the interface communication channels of the controlling computer and the smartphone when the agent of state change of buttons is controlled directly by the application of the controlling computer on internal channels of the computer.

* * * * *